(12) United States Patent
Sakakura

(10) Patent No.: US 6,826,610 B1
(45) Date of Patent: Nov. 30, 2004

(54) METHOD OF IMPROVING COMMUNICATION USING REPLICATED SERVER PROGRAM

(75) Inventor: Takashi Sakakura, Tokyo (JP)

(73) Assignee: Mitsubishi Denki Kaisha, Tokyo (JP)

(*) Notice: Subject to any disclaimer, the term of this patent is extended or adjusted under 35 U.S.C. 154(b) by 825 days.

(21) Appl. No.: 09/598,167

(22) Filed: Jun. 21, 2000

(30) Foreign Application Priority Data

Jun. 22, 1999 (JP) .......................................... 11-175661

(51) Int. Cl.[7] .......................................... G06F 15/173
(52) U.S. Cl. ...................... 709/226; 709/219; 709/229
(58) Field of Search .............................. 709/226, 219, 709/229, 231, 232, 105; 717/171, 174, 175

(56) References Cited

U.S. PATENT DOCUMENTS

| | | | | |
|---|---|---|---|---|
| 5,341,477 A | * | 8/1994 | Pitkin et al. ................. | 709/226 |
| 5,442,633 A | | 8/1995 | Perkins et al. | |
| 5,673,322 A | | 9/1997 | Pepe et al. | |
| 5,862,490 A | * | 1/1999 | Sasuta et al. ............... | 455/525 |
| 5,894,556 A | * | 4/1999 | Grimm et al. ............... | 709/227 |
| 5,991,809 A | * | 11/1999 | Kriegsman .................. | 709/226 |
| 6,061,722 A | * | 5/2000 | Lipa et al. ................... | 709/224 |
| 6,092,178 A | * | 7/2000 | Jindal et al. ................. | 712/27 |
| 6,178,460 B1 | * | 1/2001 | Maddalozzo et al. ....... | 709/239 |
| 6,304,913 B1 | * | 10/2001 | Rune .......................... | 709/241 |
| 6,360,262 B1 | * | 3/2002 | Guenthner et al. ......... | 709/226 |

FOREIGN PATENT DOCUMENTS

JP      7-84855      3/1995

* cited by examiner

*Primary Examiner*—Zarni Maung
(74) *Attorney, Agent, or Firm*—Birch, Stewart, Kolasch & Birch, LLP

(57) ABSTRACT

The present invention endorses the communication of the client and server type application program to have a good response time even if using the communication media having low transferring rate and high latency, even if the relay communication points are increased, and even if the physical distance of the communication route is increased. The characteristic of the present invention is achieved by measuring the communication characteristic between the server program 203 on the server machine and the client machine 206, and if the measured communication characteristic is not up to a pre-determined communication characteristic standard, then at least a part of the server program 203 is replicated to a server candidate machine situated closest to the client machine 206, and the client program on the client machine 206 connects to the replicated server program 202.

18 Claims, 20 Drawing Sheets

Fig. 6

| | | | | | | | |
|---|---|---|---|---|---|---|---|
| kailua.isl.melco.co.jp | 10.74.4.111 | +81467412059 | +81467412060 | yes | yes | yes | 35.29N, 139.58E |
| sextant.meitca.com | 137.203.10.12 | +16174971234 | +16174911235 | no | no | no | 42.35N, 71.20W |
| lexington.local.com | (138.10.12.1) | +15082135432 | | no | no | no | 42.49N, 71.43W |
| sw0.lexington.local.com | | +15082139901 | | no | no | no | 42.50N, 71.43W |
| sw1.lexington.local.com | | +15082139902 | | no | no | no | 42.49N, 71.44W |
| sw2.lexington.local.com | | +15082139903 | | no | no | no | 42.48N, 71.43W |

| | | 1105 | 1106 |
|---|---|---|---|
| IP;10.74.4.111 | | 1 | 0 |
| IP;137.203.10.12 | | 1 | 0 |
| PPP-IP;+15082135432 | | 1 | 0 |
| SMS;+15082139902 | | 1 | 1 |

```
601   602       603           604 605    606 607 608
kailua.isl.melco.co.jp 10.74.4.111:+81467412059:yes:yes:yes+81467412060:yes:yes:35.29N,139.58E
sextant.meitca.com 137.203.10.12:16174971234:yes:yes:yes+16174911235:yes:yes:42.35N,71.20W
                                                                            609
lexington.local.com(138.10.12.1):+15082135432:no:no:no:no:no:42.49N,71.43W
                                                                            610
sw0.lexington.local.com:+15082139901:no:no:no:no:no:no:42.50N,71.43W
                                                                            611
sw1.lexington.local.com:+15082139902:no:no:no:no:no:no:42.49N,71.44W
                                                                            612
sw2.lexington.local.com:+15082139903:no:no:no:no:no:no:42.48N,71.43W
                                                                            613
....
```

METHOD OF IMPROVING COMMUNICATION USING REPLICATED SERVER PROGRAM

BACKGROUND OF THE INVENTION

1. Field of the invention

The present invention relates to a communication method of the client and server type applications utilizing the network. Particularly, the present invention relates to the communication method to have a good response time.

2. Description of the Related Art

The wireless mobile devices such as cellular phone have become widespread in the recent years. The wireless communication functions are equipped to the mobile computers and the mobile information devices which are commonly known as PDAs (personal digital assistants). On the other hand, the network cannot be taken out of consideration upon designing the computer system, since the internet is becoming very popular. The client and server type applications are mostly being utilized on the network. To give some examples of the client and server type applications, there are the WWW (world wide web) which supplies information on the internet and the database usage on the internet.

For the most of client and server type applications, the client program and server program are in connected status via the network. The connected status is secured by the connection type communication protocol such as TCP (transmission control protocol). The connection type communication protocol transfers a data under the connected status. Since the client program and the server program transfer and receive the data with one another, they both must be equipped with a data transfer control unit specialized for transmitting and receiving the data. By utilizing the communication mechanisms of the lower level, each data transfer control unit transmits and receives a data handed over from the upper level, checks the contents of the data (i.e., checks for data errors due to noises), and controls retransmitting of the data if an error has occurred.

The connection type communication protocol confirms whether the data is transferred without problems. In order to do so, when a data receiving side program receives a data, it checks that the data contents has no errors, and then it returns an ACK message t o a data transmitting side program. The data transmitting side program will k now the receiving status of the data receiving side program from this ACK message. In other words, the data transfer is managed by the ACK message. However, the ACK message transmission becomes a burden if utilizing a communication environment where the transmitting rate and the receiving rate are non-symmetrical, and if the communication i s high latency. The disadvantage resulting from these were that a desirable transferring rate could not have been achieved. This tendency becomes more prominent especially if the communication route in use is high latency and if the mobile communication has low transferring rate.

U.S. Pat. No. 5,673,322 discloses a technique to operate the browser application, which utilizes the TCP/IP as a communication protocol, when using a mobile terminal in the wireless communication. The technique places a proxy server on the mobile terminal (referred to as local proxy hereafter). Another proxy server is placed in between the mobile terminal and the WEB server (referred to as remote proxy hereafter). The local proxy emulates the TCP/IP socket to keep a compatibility with the browser program such as Netscape. The remote proxy and the WEB server are connected by the TCP/IP. The local proxy and the remote proxy are connected by a specialized communication protocol which is suitable for the wireless communication and is secure, making it possible to attain a high communication rate even if using the wireless communication which normally has a low transferring rate. This communication rate is higher than the case of using the TCP/IP to all of the routes as it is.

The method of placing the proxies in between the client program and the server program for accessing is widely being adopted. For example, the method is adopted in the cases of accessing to the database via WEB-CGI server, and the cases of accessing from the network protected by the firewall to the internet.

U.S. Pat. No. 5,442,633 discloses a technique to optimize the IP routing information for the cases of IP connection from the wireless terminal to the network. The IP is a communication protocol which is used in sending the data packets in the internet and LAN, and transferring route of the data packets are determined based on the routing information of the packets which are normally fixed. However, the mobile terminal of course moves around such that the fixed routing will not be appropriate for the mobile terminal. According to the disclosed technique, it attaches a property to IP data packet, the property in which makes the fixed routing information on the IP data packet invalid, and then reconstructs the routing information at the first IP connecting node which is to be connected by the mobile terminal. A suitable data transferring route is obtained this way.

The problems are a decline in the communication transferring rate and an increase in the communication latency. The problems are caused by using the communication media with high latency and the communication media having low transferring rate (for example, the wireless communication), the increase in the number of interim nodes in the communication route, and the increase in the physical distance of the communication route. According to one aspect of the present invention, it attempts to solve these problems by endorsing the communication of application program having a good response time.

SUMMARY OF THE INVENTION

According to one aspect of the present invention, a communication method among at least one server machines for executing a server program, and a client machine for executing a client program, and at least one server candidate machine for executing the server program comprises:

(1) measuring a communication characteristic between the client machine and the server machine;

(2) comparing the measured communication characteristic with a pre-determined communication characteristic standard;

(3) selecting the server candidate machine, which is situated closer to the client machine than the server machine, if the measured communication characteristic is not up to the pre-determined communication characteristic standard;

(4) replicating at least a part of the server program from the server machine to the selected server candidate machine; and (5) executing the replicated server program by the server candidate machine which has replicated at least a part of the server program.

According to another aspect of the present invention, the communication method includes the server candidate machine, which executes the server program, operating as the server machine.

According to another aspect of the present invention, the communication method further comprises:

synchronizing at least a part of the server program of the server candidate machine which is a replication destination program, and at least a part of the server program of the server machine which is a replication source program.

According to another aspect of the present invention, the communication method further comprises:

performing a data communication between the server machine and the server candidate machine via a communication mechanism suitable for a communication protocol;

accumulating a statistical information regarding the data communication;

judging whether a change of the communication protocol is necessary or not based on the statistical information; and changing the communication protocol to a new communication protocol if it is judged that the change is necessary and changing the communication mechanism to a new communication mechanism suitable for the new communication protocol.

According to another aspect of the present invention, the communication method includes the server program having an interface for each kind of communication media that can be used by the client program. The communication method further comprises:

waiting for a communication request at the interface by the server program;

deciding a communication protocol based on the communication request if the server program have received the communication request; and setting a data transfer control unit which corresponds to the communication protocol According to another aspect of the present invention, the communication method includes the server machine having a server machine side redirect manager and the server candidate machine having a server candidate machine side redirect manager and a redirector. The communication method further comprises:

transmitting a message including an address of the server machine, an address of the client machine, and an address of the server candidate machine, from the client machine to the server machine;

receiving the message transmitted by the client machine, by the server machine side redirect manager;

transferring the message received by the server machine side redirect manager, to the server candidate machine based on the address of the server candidate machine which is included in the message;

receiving the message transferred by the server machine side redirect manager, by the server candidate machine side redirect manager; and registering to the redirector the address of the server machine included in the message received, and the address of the client machine included in the message received, by the server candidate machine side redirect manager.

According to another aspect of the present invention, the communication method includes the synchronizing step which synchronizes automatically.

According to another aspect of the present invention, the communication method further comprises:

storing an information which indicates whether or not the server program of the server candidate machine should depend on the server program of the server machine as an attribute information of the server program of the server candidate machine. The communication method includes the server program of the server candidate machine operating independently if the attribute information indicates that the server program of the server candidate machine does not depend on the server program of the server machine.

According to another aspect of the present invention, the communication method includes the server machine being a plurality of server machines and the server candidate machine which is a plurality of server candidate machines. The communication method further comprises:

storing a position information of the plurality of server machines;

storing a position information of the plurality of server candidate machines;

searching a server machine which is close to a position of the client machine from among the plurality of server machines; and searching a server candidate machine which is close to the client machine from among the plurality of server candidate machines.

According to another aspect of the present invention, the communication method further comprises:

transmitting a datagram message to the server program by the client program;

receiving the datagram message by the server program and returning the datagram message received immediately to the client program;

receiving the datagram message by the client program; and measuring a response time from a transmission time and a reception time of the datagram message by the client program.

According to another aspect of the present invention, the communication method further comprises:

storing a status of a use of the server program, by the client program;

judging whether a continuation of an execution of the server program is necessary or not; and stopping the execution of the server program if judged that the continuation is not necessary.

According to another aspect of the present invention, the communication method includes the client machine which can use a plurality of communication media. The communication method further comprises:

selecting an optimal communication media by the client program based on the response time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 6 illustrates an example of a data of the database which is managed by the directory service;

FIG. 11 illustrates an example of the route information;

FIG. 14 illustrates an example of a data of the database managed by the directory service after replicating and setting the server program;

DETAILED DESCRIPTION OF THE PREFERRED EMBODIMENTS

Figure 1:
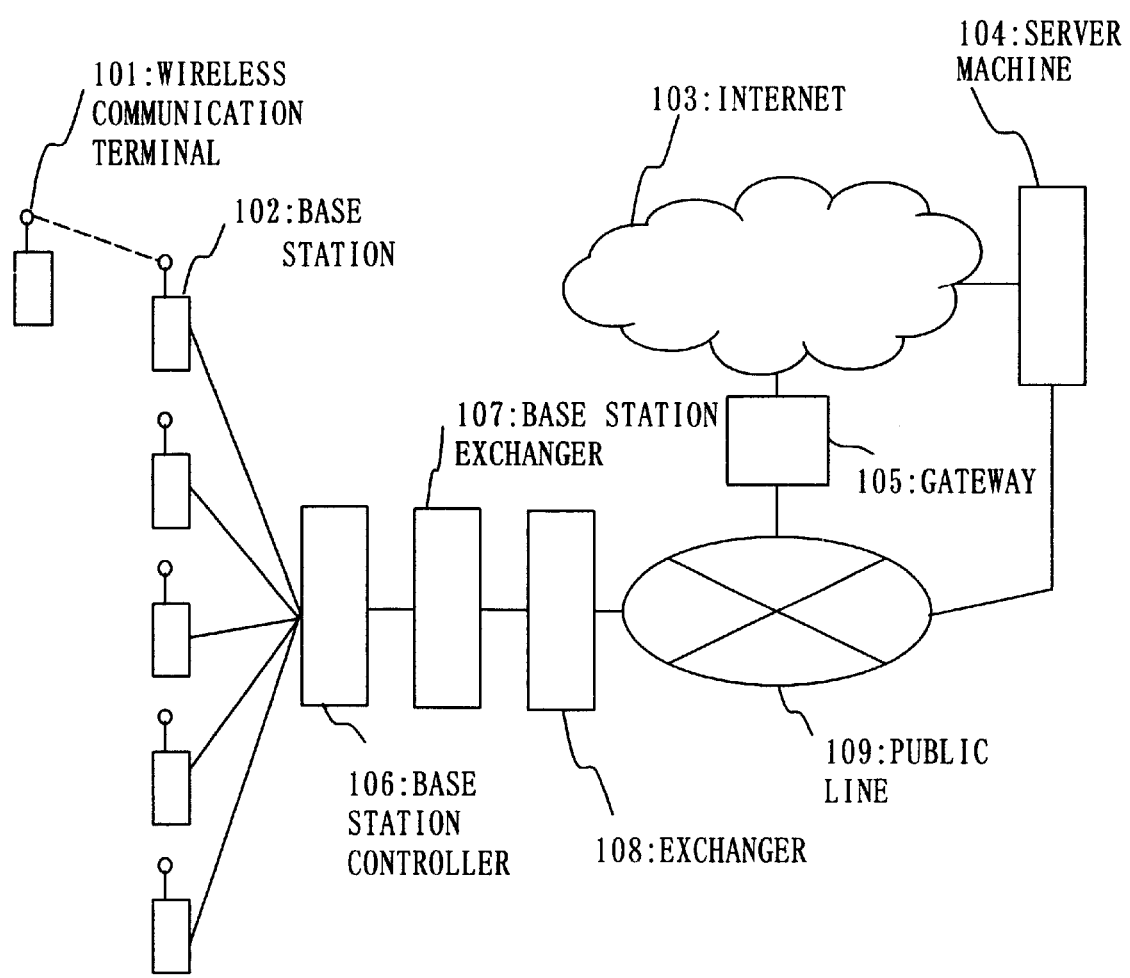
FIG. 1 illustrates a configuration of the client and server system for the present invention.

Reference will now be made in detail to the present preferred embodiments of the invention, examples of which are illustrated in the accompanying drawings, wherein like reference numerals indicate like elements throughout the several views.

The present invention is described with reference to the drawings.

Embodiment 1

The drawing of FIG. 1 illustrates the configuration of the client and server system of the present invention. The system user can utilize a service supplied by the company's server by using either a company's terminal or a mobile terminal. The description of reference numerals indicated in the FIG. 1 follows: a wireless communication terminal(s) 101; a base station(s) 102; an internet 103; a server machine 104; a gateway 105; a base station controller 106; a base station exchanger 107; an exchanger 108; and a public line 109.

A server program operates on the server machine 104. The server machine 104 is connected to the internet 103 and the public line 109. The internet 103 is likewise connected to the public line 109 via the gateway 105. The server machine 104 is the source of the server programs, which are replicated to other machines. Replication of the server programs will be described later.

The exchanger 108 connects the wireless communication network system and the public line 109. By means of the physical location or in terms of the network, the gateway 105 is situated closer to the exchanger 108 than the server machine 104.

The base station exchanger 107 is an exchanger which carries out exchanges of the connection between the base station controller 106 and the exchanger 108 in the wireless communication network system. The base station exchanger 107 also manages the communication handoff control of the wireless communication terminal 101 shifting among the base stations, and it also manages the billing information.

The base station controller 106 and the base station exchanger 107 are both configured by computers. They both can operate the replicated server program which is replicated by using the mechanism for replicating and setting the server program which will be described later. The base station controller 106 and the base station exchanger 107 are the examples of server candidate machines.

The base stations 102 are connected to the base station controller 106. The wireless communication terminal 101 is connected to a base station 102, inside a cell of the base station 102 where the position of the terminal 101 happens to be at.

The base station controller 106 has a local loop communication function. Let's assume a case of communicating between the two wireless communication terminals 101 which are connected to any one of the base stations 102 connected to the base station controller 106. These wireless communication terminals 101 are configured to communicate via the base station controller 106 only. Selection of the wireless communication network system is dependent on and determined from a position of the wireless communication terminal 101. In other words, a suitable wireless communication network system is selected and used based on the position of the wireless communication terminal.

Figure 2:
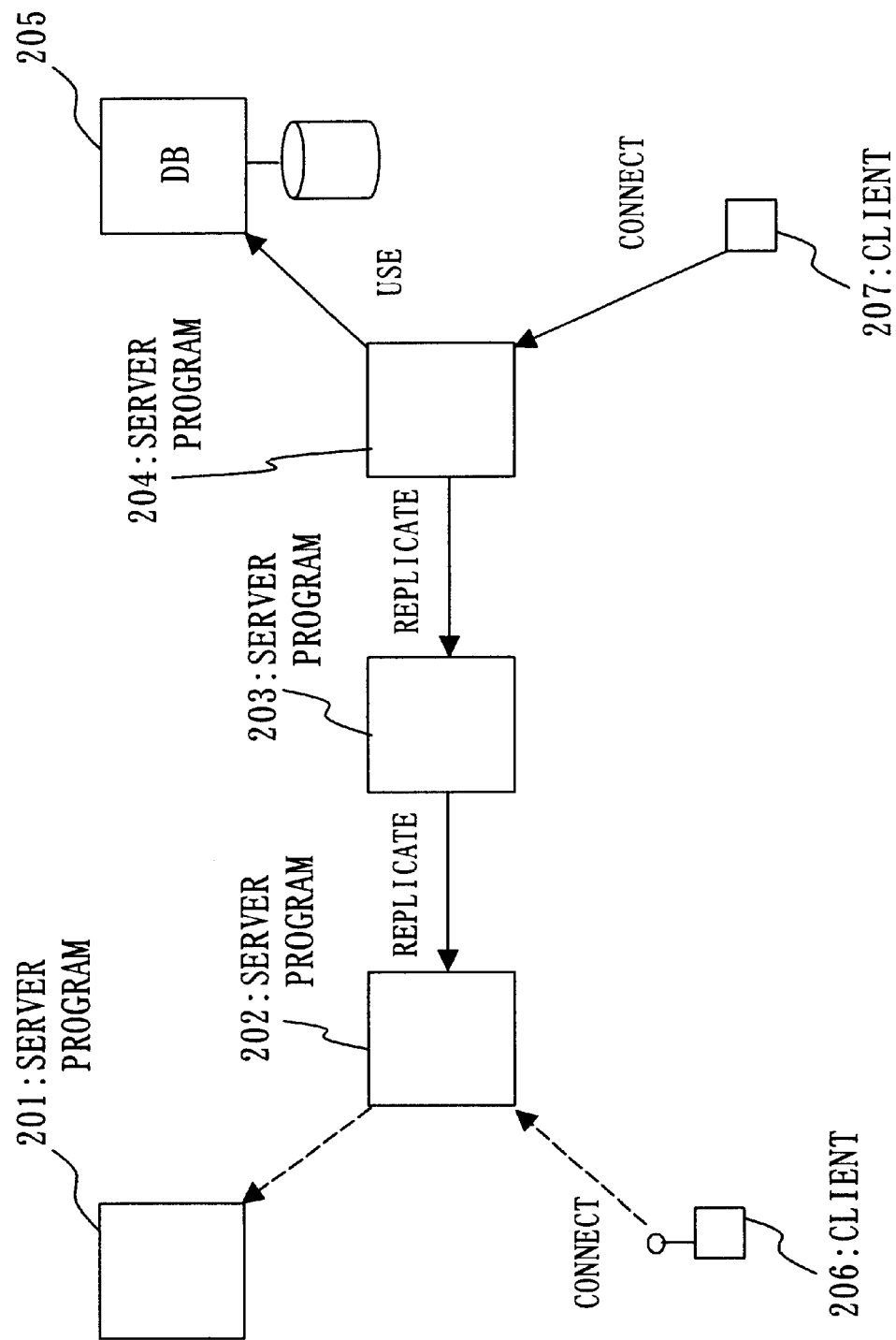
FIG. 2 illustrates a flow of replicating the server program for the present invention.

The drawing of FIG. 2 is a flow of replicating the server program for the present invention. A server program 204 is the server program which operates on the server machine 104. The server program 204 is replicated as a server program 203 which operates on the gateway 105. The server program 203 is replicated as a server program 202 which operates on the base station exchanger 107.

Further, the replicated server program 202 may also be replicated on a machine having the wireless communication function. A replicated server program 201 operates as an independent server. However, the replicated server program 201 cannot use resources such as database 205 which is the outer unit used by the original server program 204.

The route taken in replicating a service program is determined by the method which will be described later, and is decided based on the statistical access information and the information on the client's position, for instance, the GPS (global positioning system).

The clients 206 and 207 can select and connect to the original server program 204 or to the replicated server programs 201, 202, or 203.

Figure 3:
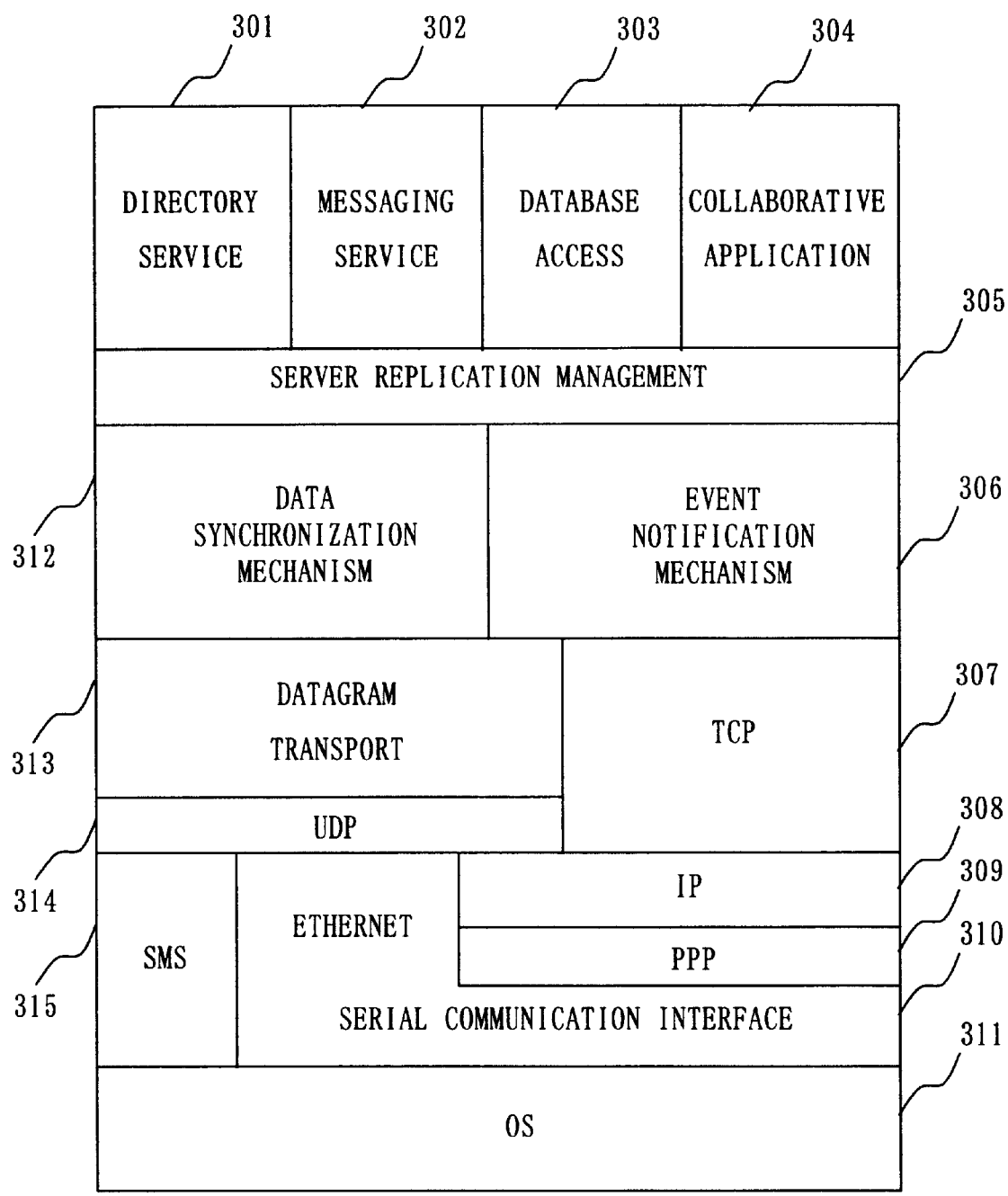
FIG. 3 illustrates a software configuration of a machine where the server program operates for the present invention.

The drawing of FIG. 3 illustrates the software configuration of the machine where the server program operates for the present invention. The server program comprises application programs, which supply services to the client program as servers, and an object data which will be described later. In the example, the application programs are a directory service 301, a messaging service 302, a database access service 303, and a collaborative application 304 (such as managing schedule and arrange meeting among users).

These application programs are configured to operate under the environment of other software, replicated by the method of present invention, and set at each machine. However, the object data will be necessary in order for the application programs to operate as the server programs, the object data of which will be described later.

A server program replication management mechanism 305 (referred to as server replication management 305 hereafter) is described below.

The server replication management 305 operates by using the following mechanisms: a data synchronization mechanism 312; an event notification mechanism 306; the directory service 301; a communication latency measuring mechanism; and a mechanism for optimizing the communication protocol. The event notification mechanism 306 is configured to carry out the non-synchronous communication using the communication method of the transport layer. In this example, the communication latency measuring mechanism is configured to supply its function as a part of the event notification mechanism 306. The mechanism for optimizing the communication protocol selects the most suited one from among a plurality of communication handsets, and optimize the protocol of the connection type transport mechanism.

The data synchronization mechanism 312 is a mechanism for maintaining the consistency of a certain data unit (referred to as object data hereafter). Let's assume a case where any one of the object data replicated and set among a plurality of sites is updated, then the data synchronization mechanism 312 is configured in such a manner as to maintain the consistency by mutually transmitting and receiving the difference between the object data and the updated data. In other words, what is meant by the data synchronization here is to manage the data stored at more than two localities to be consistent in their content.

One of the characteristics of the data synchronization mechanism 312 is in that the server programs in various sites can utilize the object data stored at their data synchronization mechanisms even if the communication is interrupt. Another characteristic is in that the differential data only is exchanged when the data is updated such that the amount of data communication is reduced.

Figure 4:
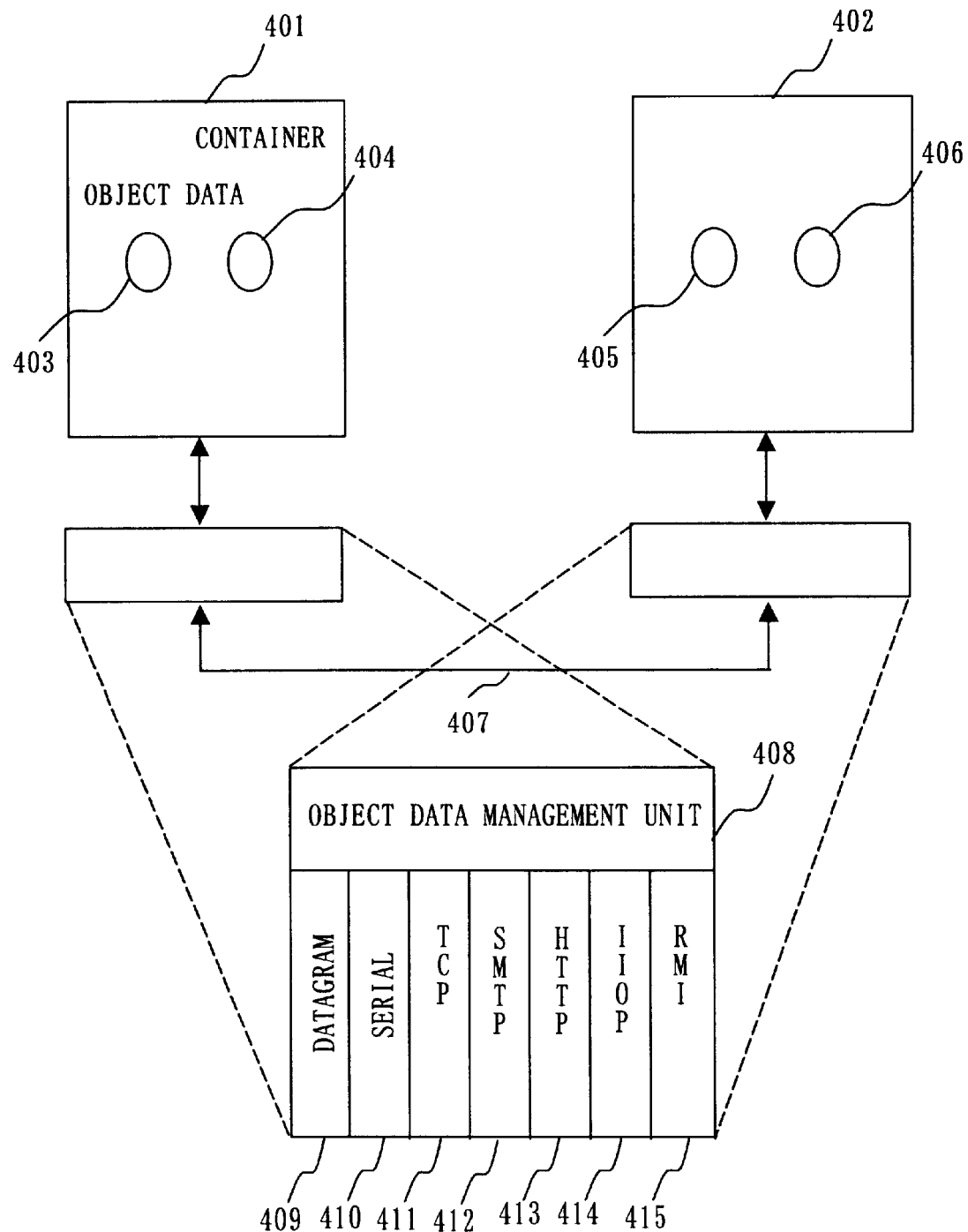
FIG. 4 illustrates a configuration of a mechanism for managing data.

The data synchronization mechanism 312 is a core mechanism of the data management for the present invention. The drawing of FIG. 4 illustrates the configuration of the data management mechanism. The reference numeral indicated in the drawing of FIG. 4 are: containers 401 and 402; and object data 403, 404, 405, and 406. An arrow 407 indicates an operation of the data synchronization.

The object data 403, 404, 405, and 406 are data subject to operations (such as insert, update, and delete) operated by the application programs. The container 401 is a mechanism for storing and managing the object data 403 and 404. Likewise, the container 402 is a mechanism for storing and managing the object data 405 and 406. The containers 401 and 402 are supplied by the data synchronization mechanism 312. The container 402 forms a pair with the container 401, and operates on a machine different from the machine where the container 401 operates. The object data 403, 404, 405, and 406 are synchronized on the containers 401 and 402. The object data 403 forms a pair with the object data 405. Further, the object data 404 forms a pair with the object data 406. These pairs are synchronized with one another. That is, update of an object data is performed on the other object data of the pair by the data synchronization.

An object data managing unit 408 manages the object data which is inserted, updated, or deleted from the application programs. In specific terms, when an object data is updated, an updated side of the object data managing unit 408 generates a differential data and transfers the differential data to the corresponding object data of the pair. A transferred side of the object data managing unit 408 performs the update based on the transferred differential data on the other object data of the pair. The differential data is transferred via the communication mechanisms 409, 410, 411, 412, 413, 414, and 415 in which the various communication protocols correspond to. The selection of a communication mechanism in which the optimal communication protocol corresponds to is described in detail in the embodiment 2.

The event notification mechanism 306 is an interface for the server programs to clearly transmit and receive data. In specific terms, it is an interface between the server programs and the client program. The event notification mechanism 306 does not depend on the communication mechanism of the lower level. Even if the lower level communication mechanisms have changed, the interface supplied to the server programs above remains unchanged. That is, the event notification mechanism 306 supplies the same interface throughout. Accordingly, the application programs can utilize the same interface even in the case of using the datagram communication mechanism of the connectionless type. The same can be said for the case of using the TCP communication mechanism.

A datagram transport 313 supplies the datagram communication mechanism of the connectionless type. The datagram transport 313 converts all datagram messages from the lower level communication mechanisms into UDP314 packet format, making it possible even to accept the IP packet from this.

TCP 307 supplies the connection type of communication mechanism. In the example of FIG. 3, TCP, which is used most commonly, is being adopted. However, the connection type of communication mechanism selects the optimal communication protocol by utilizing a function for optimizing the communication protocol. This optimization is carried out as required. Also, this optimization process updates the communication protocol of both machines under the environment which can specify the other end of the connection of the machine pair.

In the present system, communication network layer mechanisms 308, 309, 310, 311, and 315 are prepared. These enables the machines to deal with various communication media. The SMS 315 can receive a short message used in the digital wireless communication system and converts it to an UDP message. Also, it can receive the UDP message and converts it to the short message. The IP 308 transfers the IP packet via the PPP (point to point protocol). These transfers are carried out via the ethernet/serial communication interface 310. The OS 311 is provided with a device driver for the various communication media.

As described so far, the present invention comprises the system and the software.

Following is the explanation to the configuration and operation of the server programs.

First of all, the directory service 301 is described below.

The directory service 301 supplies an information related to the server program of the system. The directory service 301 is used from the client program or from the server program. The user utilizing the directory service 301 instructs operations (such as add, refer, update, and delete information) via a port supplied by the directory service 301. The database managed by the directory service 301 is set on the container prepared by the data synchronization mechanism 312. The data of the database is stored in a format of the object data. The directory service 301 manages the statuses of the server machine 104, the gateway 105, the exchanger 108, and the base station exchanger 107. In this example, looking from the notion of effect on the cost involved, the status of the base station controller 106 is not managed. However, it is also possible to manage the status of the base station controller 106.

Figure 5:
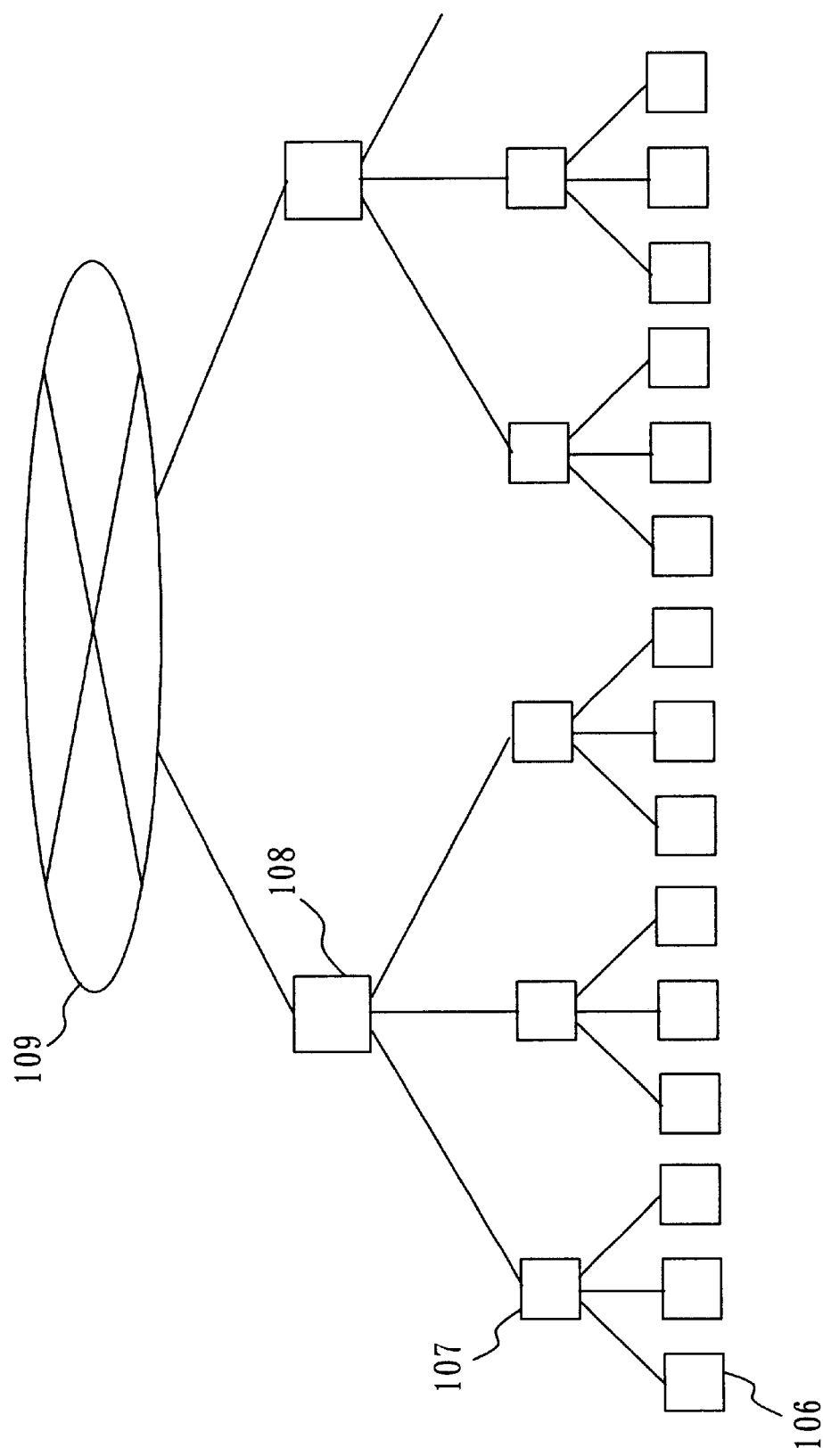
FIG. 5 illustrates a network system of the wireless communication.

Previously described drawing of FIG. 1 indicates the routes from the server machine 104, which is the origin, to the wireless communication terminal 101. However, the actual system includes a plurality of gateways 105. In addition to that, the wireless communication network system is configured as shown in the drawing of FIG. 5. As can be seen from this drawing, the network system comprises a plurality of clusters with the exchangers 108 at the very top. The base station exchangers 107 cover the service areas.

The software installed in the server machine 104 are also installed in the gateways 105, the exchangers 108, the base station exchangers 107. The ports for the server replication management 305 of these machines are in the listening statuses.

The drawing of FIG. 6 illustrates the example of data of the database managed by the directory service 301. Records 601, 609, 610, 611, 612, and 613 are the records of this database. Each record is divided into fields by a delimiter (:). The directory service 301 has a search function which keys are the data of each field.

The record 601 indicates a status of the server machine 104. The field 602 is a field for storing the IP address and the host name of a machine in which its status is managed. In this example, the host name "kailua.isl.melco.co.jp", the data of which is displayed as a character string, and the IP address "10.74.4.111", the data of which is displayed as a numeric character set are registered. The field 603 is a field for storing a telephone number used upon connecting to the net. In this example, the telephone number "+81467412059" is being stored. The field 604 is a field for storing the execution status of the directory service 301. The field 604 of the server machine 104, which is the origin, stores "yes" indicating execution. The field 605 is a field for storing the execution status of the messaging service 302. In this example, the telephone number indicated as "+81467412060" is a telephone number to be used by the messaging manager 701. This telephone number is used upon connecting to the net. The messaging manger 701 will be described later. The field 606 is a field for storing the execution status of the database access service 303. The field 607 is a field for storing the execution status of the collaborative application service 304. The field 608 is a field for storing the information related to the geographical location of the machine. This geographical information is expressed using the latitude and longitude.

The record 609 indicates the status of the gateway 105. The gateway of this example is positioned at the East Coast, USA. This fact can be read from the field 608 of the record 609. The fields 604, 605, 606, and 607 of the record 609 indicate that none of the service programs of the gateway 105 is in execution.

The record 610 indicates the status of the exchanger 108. The field 602 of the record 610 indicates the IP address of this exchanger 108 is "138.10.12.1", and it also indicates that this IP address is provided as partially fixed. The display in brackets indicates that the IP address is partially fixed. In this example, the reason why the IP address is partially fixed is because the exchanger 108 is connected to the internet 103 via the PPP 310 responding to the needs.

The records 611, 612, and 613 indicate the statuses of the base station exchanger 107. Within the fields 602 of the records 611, 612, and 613, the host name "sw0.lexington.local.com", "sw1.lexington.local.com", and "sw3.lexington.local.com" which are a character string that are registered, however, the IP address which is a numeric character set is not registered. This is because the base station exchanger 107 does not always is connected via IP 308.

As described above, the directory service 301 refers to the database and then update the database. One of the characteristics of the directory service 301 of a machine is to search for the other machine which fits in the combined conditions of the geographical location of the machine; and the operation status of each server program. For example, among the machines in which a specific service program is operating, a directory service 301 can search for a machine which is geographically closest to a specific client. Also, among the machines in which a specific service program is not operating, a directory service 301 can search a machine which is geographically closest to a specific client.

The messaging service 302 is described next.

Figure 7:
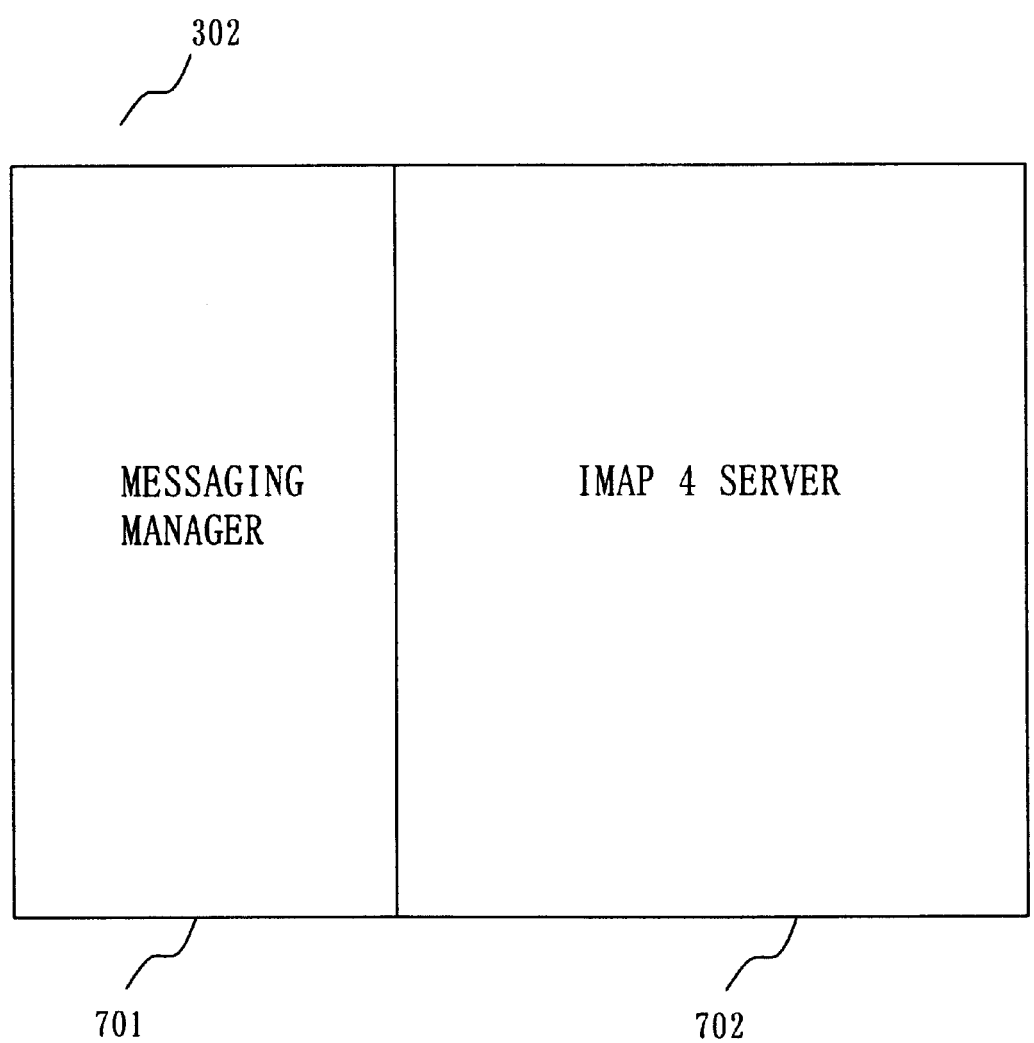
FIG. 7 illustrates a configuration of the messaging service.

The drawing of FIG. 7 illustrates the configuration of the messaging service 302. The messaging service 302 comprises the messaging manager 701 and the IMAP 4 server 702.

The IMAP 4 server 702 is a server for supplying the service corresponding to the IMAP 4. The IMAP 4 is an electronic mail protocol characterized in that it keeps an electronic mail data at the server side. Normally, the IMAP 4 operates on the TCP/IP. However, the IMAP 4 server 702 in this example can operate using various datagram communications, not just the TCP/IP. This is because the IMAP 4 server 702 is configured on the event notification mechanism 306.

The messaging manager 701 supplies a data received at the communication devices such as smart phone and fax via the modem to the IMAP 4 702 server, as the electronic mail data.

Also, the messaging manager 701 finds a data addressed to the smart phone and fax contained in the electronic mail data received by the IMAP 4 server 702, and supplies the data to the communication devices.

The IMAP 4 server 702 of the messaging service 302 manages the electronic mail data on the data synchronization mechanism 312.

The database access service 303 is described next.

The user can select one of the operation mode among from the two operation modes regarding the operation of the database access service 303. The selected operation mode is initially set at the server machine 104.

One of the operation modes is a mode which cannot update the data of the database 205. In the case of selecting this operation mode, the referring data is managed on the data synchronization mechanism 312. This management is the same as the management of the previously described electronic mail data. Since the database 205 is managed this way, each machine can replicate and set the data access service 303.

The other operation mode is a mode which can update the data of the database 205. The server machine 104 manages a queue for requesting the transaction to the database. The client program connects to the database access service 303 on the server 104. Then, the transaction request is stored in to the queue.

The case of selecting the operation mode which cannot update data is described below in detail.

The request for accessing to the data is created in the object data format. Then, this object data is stored in the container of the data synchronization mechanism 312. SQL text is contained in this object data. The database access service 303 sends this SQL text to the database 205. The database replies to this SQL text. This reply is included in another object data.

Figure 8:
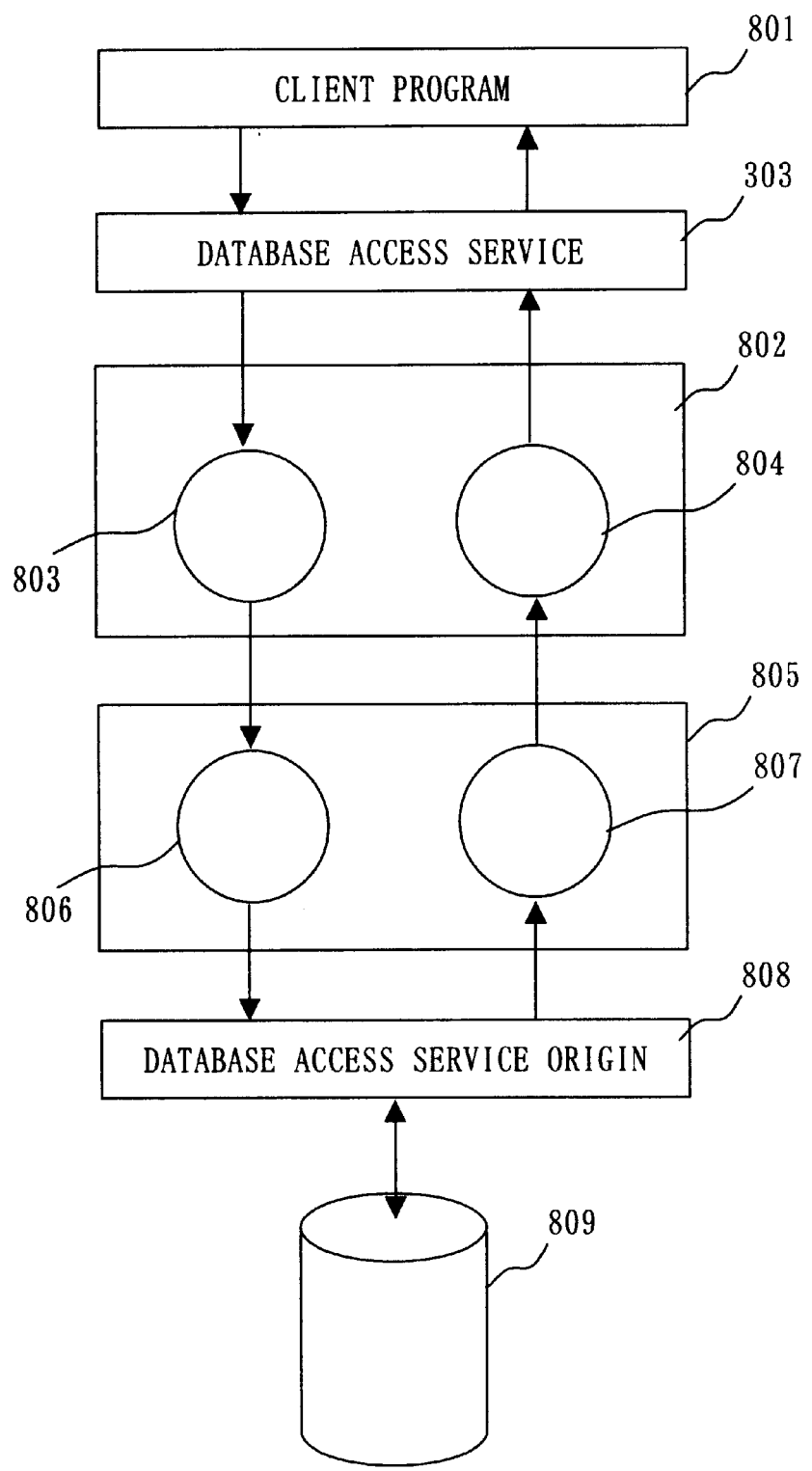
FIG. 8 illustrates a data flow for referring to the data from the client program.

FIG. 8 is a drawing which illustrates the data flow in the case of the client program requesting access to the data. The client program 801 sends requests to access to the data to the replicated database access service 303. This request uses the SQL text. The database access service 303 stores the data object including this SQL text in the container 802 which is on the data synchronization mechanism 312. This data synchronization mechanism 312 is managed by the database access service 303.

The container 805 is a container managed by the database access service 303 of the server 104 which is the source. Here, the data access service 303 is referred to as database access service origin 808. The container 802 and the container 805 are in the synchronized mode. Accordingly, the object data 803 stored in the container 802 is replicated to the container 805. As a result of this, a new object data 806 appears inside the container 805. The database access service origin 808 finds the new object data 806 and reads the SQL text included in the object data 806. Then, the database access service origin 808 inquires to the database 809 using this SQL text. The object data 807 is an object data updated by the database access service origin 808. The update of the object data 807 is replicated to the object data 804. The object data 804 is forming a pair with the object data 807. The replicated database access service 303 reads the accessed data from the object data 804. Then, the replicated database access service 303 returns this data to the client program 801.

The collaborative application service 304 is described next.

The collaborative application service 304 is a service such as arranging conferences among the system users. The collaborative application service 304 uses the messaging service 302 and the database access service 303.

The event notification mechanism 306 is used in the communication among these server programs and the client program. The event notification mechanism 306 has a port number corresponding to each service.

The event notification mechanism 306 is described next.

Figure 9:
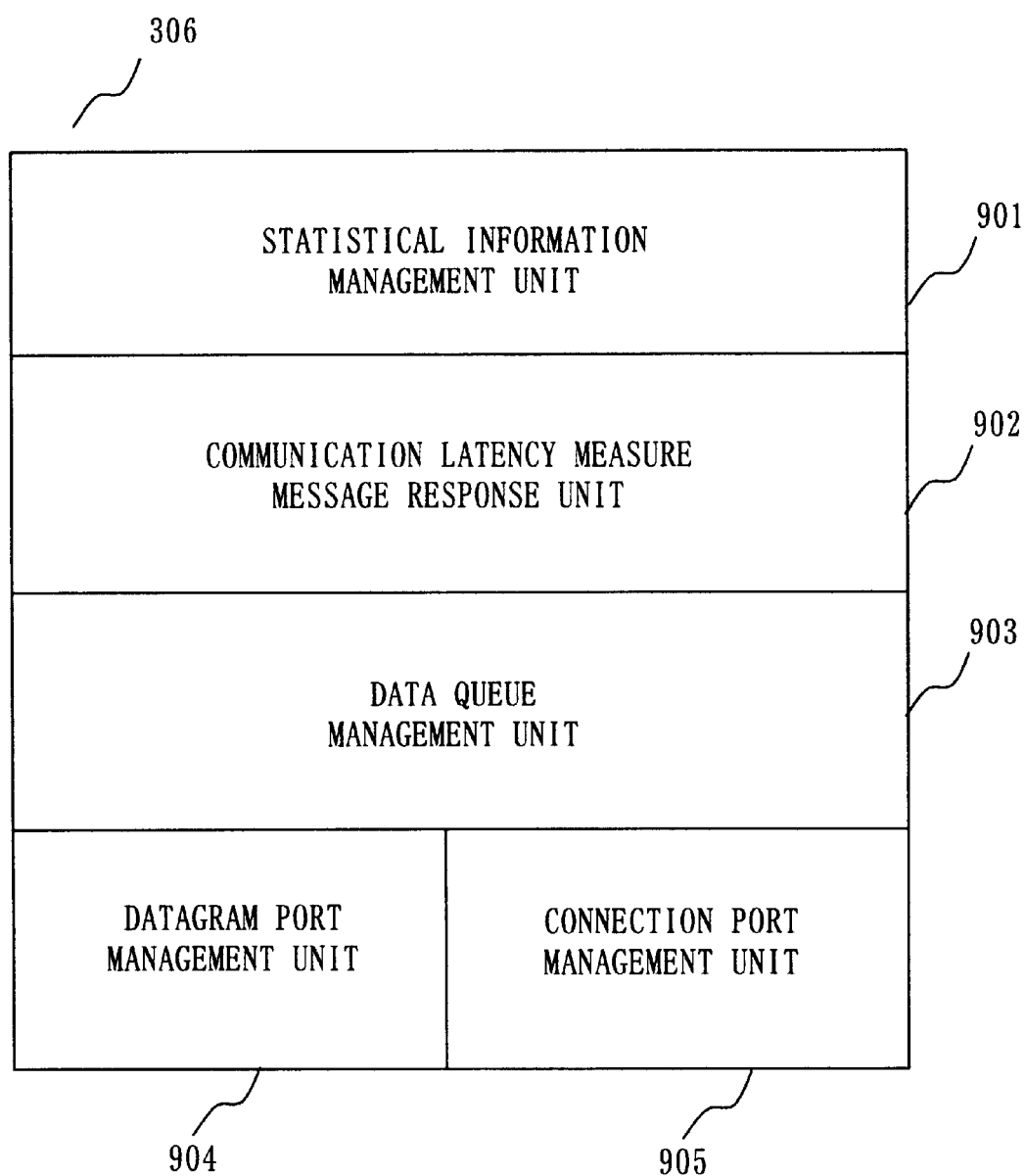
FIG. 9 illustrates a configuration of the event notification mechanism.

The drawing of FIG. 9 illustrates the configuration of the event notification mechanism 306. The characteristics of the event notification mechanism 306 are in that it has the connectionless type communication mechanism (datagram) and the connection type communication mechanism (TCP) as the lover level communication mechanisms, and it provides a send and receive communication programming interface uniformly to the application program.

A data queue management unit 903 uses a datagram port management unit 904 and a connection port management unit 905. The data queue management unit 903 manages a data queue for each port number. A communication latency measure message response unit 902 replies to the messages received at port for a measure of communication latency. A statistical information management unit 901 manages a statistical information related to the messages received by the event notification mechanism 306.

The port number is used to specify the communication destination within the host or to specify the communication source within the host. The port number is an unique number. The port number can be used at both the connectionless type communication mechanism and the connection type communication mechanism.

The datagram port management unit 904 (connectionless type) uses the port number managed by the data queue management unit 903 as it is. That is, when the datagram port management unit 904 receives a packet from the datagram transport 313, it uses the port number used at that time and hands over the received packet to the data queue management unit 903. Then, the data queue management unit 903 inserts this packet to the a data queue for receiving, which corresponds to that port number. Conversely, when sending the data, the datagram transport management unit 904 receives a packet for sending together with the port number from the data queue management unit 903, and hands over this packet together with the port number to the datagram transport 313.

The connection port management unit 905 is a connection type. Therefore, an independent process context is required in order to send and receive the data. Also, it has the needs to deal with the listening of port allocation of the data queue management unit 903 and the listening of requesting connection of the connection port management unit 905. Due to these requirements, the connection port management unit 905 must manage the port numbers so that these port numbers for listening purposes will not compete with one another.

In specific terms, the whole numbers less than 10000 are used as port numbers for listening to the connection port management unit 905 and for securing by connect. The whole numbers greater than 10001 are used as port numbers for listening to the data queue management unit 903.

For instance, let's describe a case of utilizing the messaging service 302. The IMAP 4 listening port "143" is used as a listening port number for this service by the connection port management unit 905. A number "10143" is used as a listening port number by the data queue management unit 903. A programming interface of the data queue management unit 903 is expressed as "new_port=listen(10143, 143);". When the connection port management unit 905 receives the connection request at the listening port, it requests the data queue management unit 903 to secure a new port and requests to secure a data queue. Upon these requests, the listening port number is handed over. Then, when this request is successful, the port number of the data queue management unit 903 and a newly secured port number are stored in relation to one another.

The process contexts required in the write process and the read process of a connection are created upon establishing the connection.

An operation of the data queue after establishing the connection is same as the case of utilizing the datagram port management unit 904.

Figure 10:
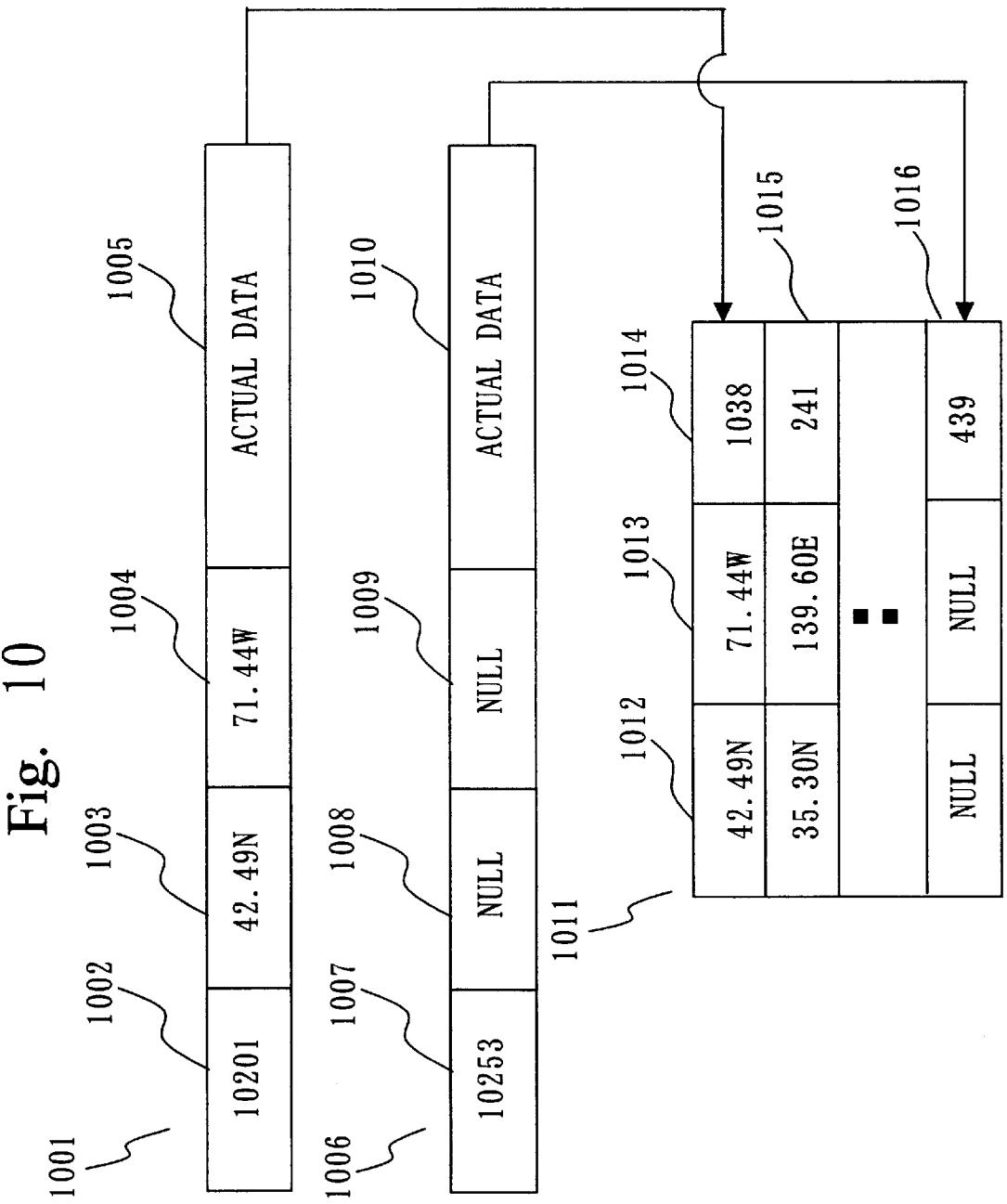
FIG. 10 illustrates a configuration of the statistical information and the packet.

The drawing of FIG. 10 illustrates the configuration of the packet and the statistical information.

For the cases of passing via the datagram port management unit 904, the data queue management unit 903 receives a packet for which its configuration is shown in 1001.

The description of reference numerals indicated in the drawing of FIG. 10 follows: a port number 1002 of the data queue management unit 903; a latitude information of client 1003; a longitude information of client 1004; and an actual data 1005. The communication mechanism of the client adds the information 1002, 1003, and 1004 to the normal datagram packet.

For the cases of passing via the connection port management unit 905, a packet having the configuration indicated in 1006 is received. The data obtained at the connection port is the actual data 1010 only. The connection port management unit 905 adds a port number 1007 of the data queue management unit 903, a latitude information of the client 1008, and a longitude information of the client 1009. However, a position of the client is virtually unknown, therefore, NULL is set at both the latitude information 1008 of the client and the longitude information 1009 of the client, indicating unknown.

The data queue management unit 903 inserts a packet to the data queue corresponding to a specified port. The statistical information 1011 is updated at every insertion of the packets. Each entry is made of a latitude information 1012 of the client, a longitude information 1013 of the client, and a receiving packet count 1014. When the statistical information management unit 901 has received a packet having a new position information of the client (made of the latitude and longitude information), a new entry is added to the statistical information 1011. When the statistical information management unit 901 has received a packet having the position information which is already being registered, "1" is added to the receiving packet count 1014. The reference numeral 1016 indicates the receiving packet count of the packets which do not have the position information of the client.

The statistical information management unit 901 has a function to return the receiving packet counts corresponding to the position information of a specified client based on the statistical information 1011.

The communication latency measure message response unit 902 calculates the communication latency by transferring a route information and receiving back the route information. The drawing of FIG. 11 illustrates the example of the route information. The reference numeral 1101 indicates a communication protocol to be used at the transmission source upon the datagram transfer, and an address of the transmission source. The transmission source attaches a port number "10001" to this address and transfers the route information. The communication latency measure message response unit 902 uses a fixed port (port number 1000) of the data queue management unit 903. This route information is transferred to the communication protocol IP address 137.203.10.12 indicated in 1102. When the communication latency measure message response unit 902 of this node receives this route information, a column 1105 of the IP address 1102, which is included within this route information, is set to "1". If this column is 1, it means that the forward path transfer is done. The route information is transferred to a node indicated in 1103, and then it arrives to a final node indicated in 1104. After that, the route information goes along the return path. The communication latency measure message response unit 902 of the transmission source receives the route information at a port having the port number 10001 and calculate the communication latency by measuring the time lapsed from the transmission time to the receiving time.

The replication and set up mechanism of the server program is described next.

Figure 12:
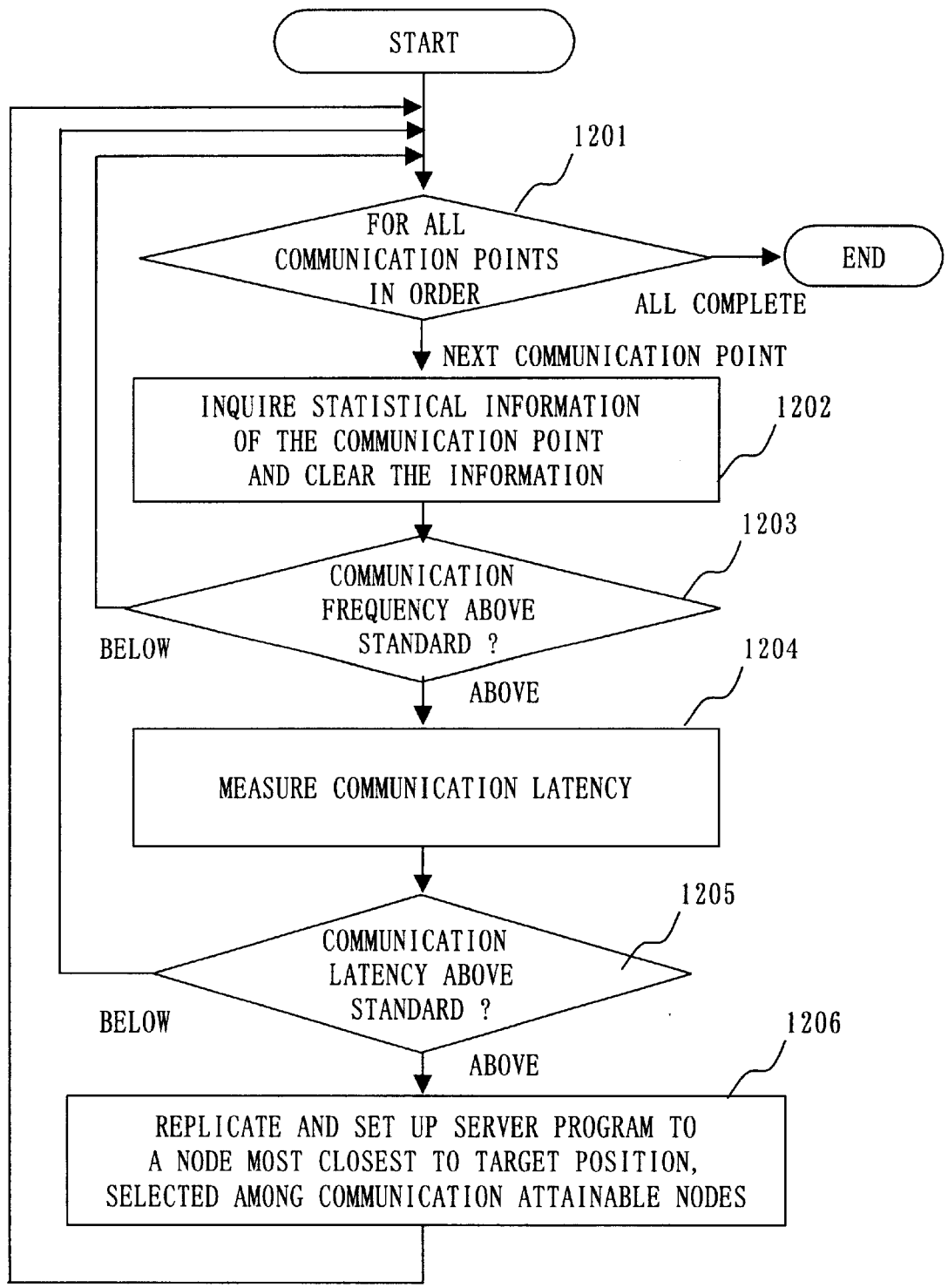
FIG. 12 illustrates a flow for deciding the requirement of replicating and setting the server program.

The replication and set up processes are carried out by the server replication management 305. The need for the replication and the set up is determined based on the frequency and the latency of communication from the client. The drawing of FIG. 12 illustrates a flow which determines the need for the replication and set up of the server program. The server replication management 305 periodically carries out this decision and replicates and sets up the server program if decided as required.

In step 1201, processes beyond step 1202 are carried out for the nodes (communication points) managed by the statistical information management unit 901 for every entry. If the processes beyond the step 1202 are complete for every entry, except for the entries indicating NULL at the latitude information of the client 1012 and the longitude information of the client 1013, then the process is temporarily stopped and enters a resting period. After the resting period, the process recommences from the step 1201.

In the step 1202, the statistical information of a node is inquired, and after that, the data of an entry which was used to manage this node is cleared. The reason for this clearing of the data is so a decision is made based on the data obtained during the resting period. In other words, the decision is made based on the dynamic usage frequency of given period. Step 1203 checks whether or not the frequency of communication is above the standard value. For example, during the resting period of 10 minutes, whether or not the communication took place more than 10 times is set as a standard.

If the frequency of communication is more than the standard value, then the communication latency is measured by using the route information illustrated in FIG. 11 (step 1204). If the time of communication latency is greater than the standard value, then the decision is made that the replication and set up of the server program is required (step 1205). In step 1206, the replication and set up of the server program is carried out.

Figure 13:
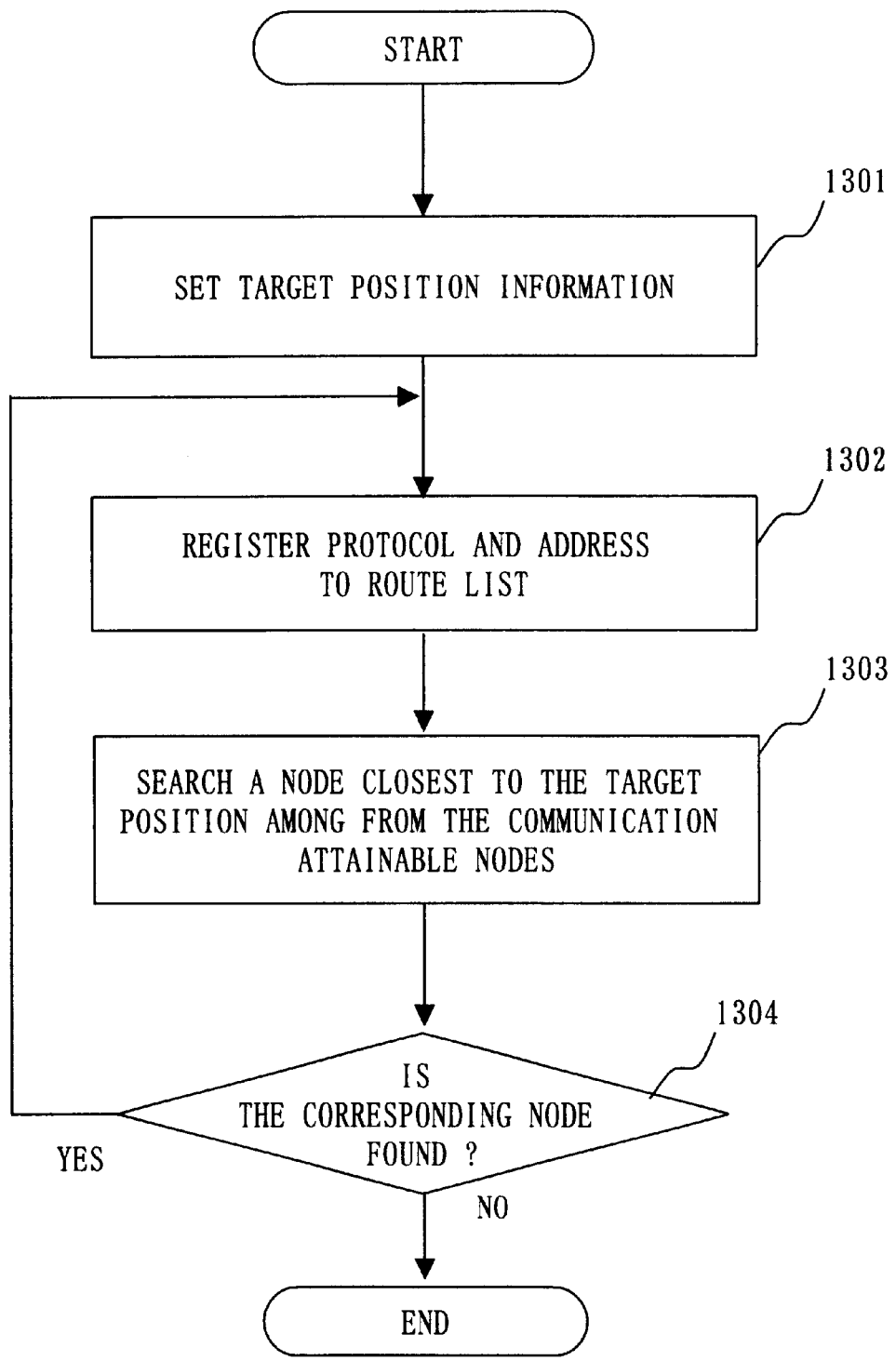
FIG. 13 illustrates a process flow for creating the route information.

The drawing of FIG. 13 illustrates the process flow for creating the route information of FIG. 11.

In step 1301, a position information of the objective is set as a target of measuring the communication latency. In step 1302, the most excellent communication media possessed by this system is selected and the protocol corresponding to the selected media is registered. Also, the address of this protocol is registered. Columns of the forward path and the returning path are initialized by 0. In step 1303, among the nodes attainable by this protocol, a node which is closest in position to the target is searched for. This search uses a search function of the directory service 301. If there is a closest node which is closer to the target than the node that is already registered in the route information (step 1303), then the process returns to the step 1302 (step 1304) and this closest node is registered to the route information (step 1302). If there is no closest node at all, then a protocol which is the second best is selected, and once again a search is performed for a node closest to the target (step 1303). If such a node is found, then this node is registered to the route information (steps 1304 and 1302).

The excellent protocol is selected among from the communication protocols corresponding to the communication mechanisms 409, 410, 411, 412, 413, 414, and 415 shown in FIG. 4. For example, the communication protocol having a high communication rate is selected.

The server replication and set up processes of the step 1206 is described next.

The application programs, which are the execution codes of the server programs, are already installed in all the candidate nodes for the server program replication and set up. Accordingly, the replication and set up processes replicate a necessary data and execute the program. What is meant by the necessary data is a data required for each server program to operate. This data is managed as the object data within the container of the data synchronization mechanism 312. The necessary data is replicated by the data synchronization process of the data synchronization mechanism 312. The application program is called out by using the container list of the data synchronization mechanism 312 as a factor, and then commencing the replication and set up processes.

Let's assume a case of setting a node having the host name kailua shown in the entry 601 of FIG. 6 as the source of replication, and a node having the host name sextant shown in the entry 609 as the destination of replication and set up. The server replication management 305 transfers a list of container names used by each service program and a node information of kailua, to the port having a port number 2000. The port number 20000 is a known port. This port is uniformly prepared at the event notification mechanism 306 of all the candidate nodes for the server program replication and set up. The example of the list of the container names is shown below.

<<Beginning of the list>>
  Directory service: dirdata
  Messaging service: messagedata
  Database access service: DBaccessdata
  Collaborative application service: coldata
<<End of the list>>

When the server replication management 305 of the sextant receives these data, it creates empty containers using the four names mentioned above. These containers are created on the data synchronization mechanism 312 of the sextant. The server replication management 305 will know from the node information that can be used by the IP, so the TCP 411 is selected among from the communication mechanisms 409, 410, 411, 412, 413, 414, and 415, and the selected protocol is set to the data synchronization mechanism 312. However, if the server program is already being replicated and set up, then the flow completes without doing anything.

When the containers are created and the communication mechanism is set, the server replication management 305 issues a data synchronization instruction to each container. Then, it waits for all the data synchronizations to complete. That is, it waits for all the object data in each container to be replicated.

When the data synchronizations are complete, the server replication management 305 executes the execution code of each server program. The factor of command for the execution is each container name. When all of the server programs 301, 302, 303, and 304 commence execution, they access the directory service 301. This access is an access for updating the server program execution statuses of a node which is the replication and set up destination of the server program. The drawing of FIG. 14 illustrates the example of a data of the database managed by the directory service 301 after the replication and set up of the server program. As shown in this drawing, each service of the sextant node is in operation. When there is an access to update the data, the directory service 301 issues a data synchronization command after the update is finished. The database managed by the directory service 301 is replicated from this data synchronization command. The directory service 301 of the replication destination of the server program obtains a new service operation status from this replication.

Depending on a need to do so, client program checks whether or not a node in which the server program is being set is located close to the client machine itself. If there is such a node present close by, the client program changes the connection destination to this node.

When the frequency of server program usage by the client program increases and when the communication latency became high, then the server machine which had set up this server program replicates and sets the server program to a server candidate machine which is situated close to the client machine. Accordingly, when the server program is set up in the server candidate machine as a replication destination, it operates in a similar manner as the server which is the replication source. That is, the server program can be replicated and set up to the other nodes. This is possible because the server replication management 305 of the replication destination is same as the server replication management 305 of the replication source.

Embodiment 2

In the embodiment 1, the TCP 411 is selected as the communication mechanism. However, in the embodiment 2, updating of the communication mechanism is described. The necessity to update the communication mechanism is determined based on the statistical information related to the communication. The communication in this case is a communication for transferring the differential data. The transferring of the differential data occurs during the data synchronization process.

Figure 15:
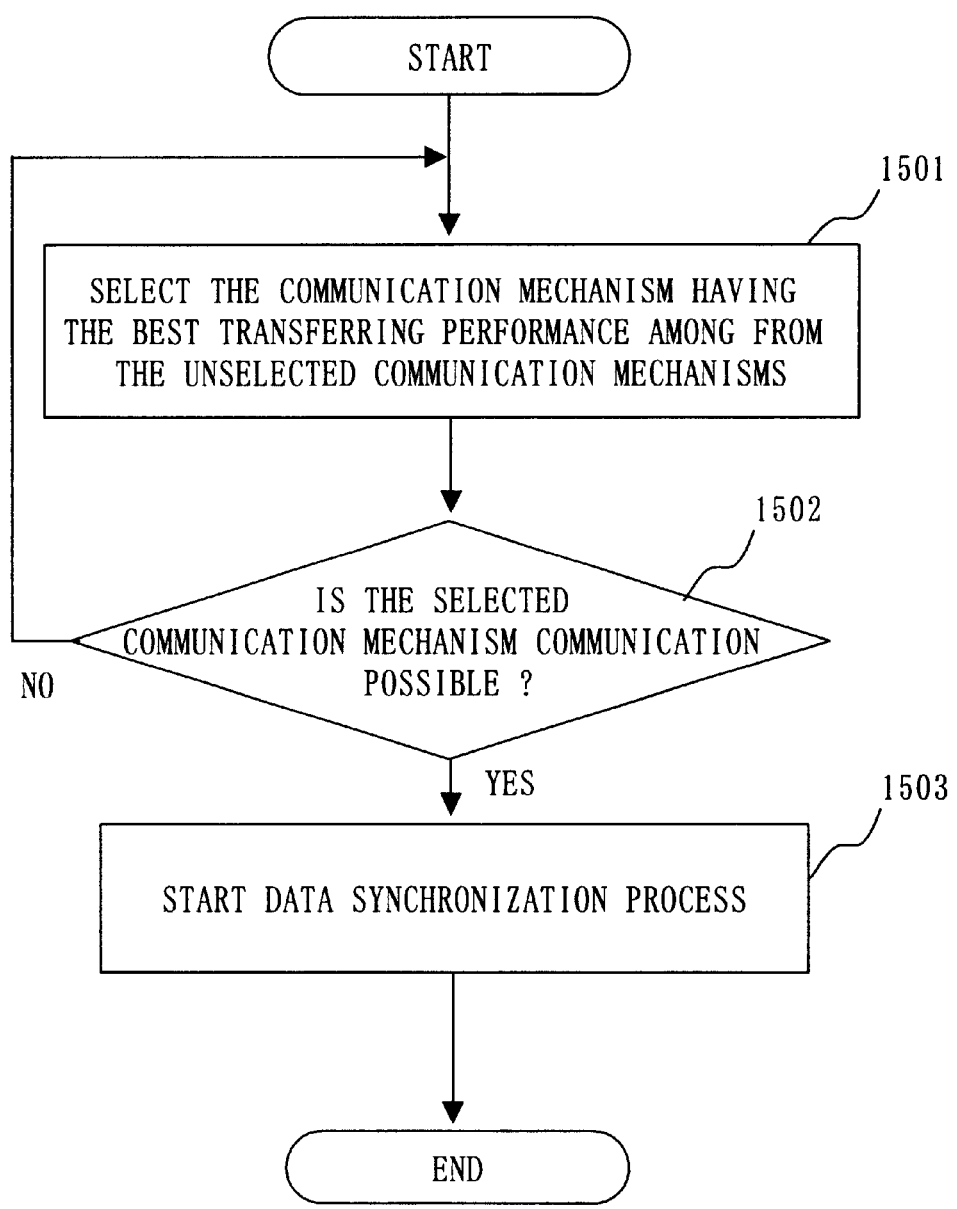
FIG. 15 illustrates an algorithm for selecting the communication mechanism.

The statistical information related to the communication, for example, is a record that may or may not indicate that an error has occurred during the data synchronization process. Based on this statistical information, the data synchronization mechanism 312 selects the suitable communication mechanisms 409, 410, 411, 412, 413, 414, and 415. The drawing of FIG. 15 illustrates an algorithm for selecting the communication mechanism.

In step 1501, the data synchronization mechanism 312 selects the communication protocol that can expect the most excellent performance among from the communication protocols in which the installed communication mechanisms 409, 410, 411, 412, 413, 414, and 415 corresponds to. For example, let's describe the case of the sextant. As illustrated in the gateway 105 of FIG. 1, the sextant can regularly connect to the internet by using the modem. So, let's select the TCP 411 which is used in the internet connection.

In step 1502, the selected communication mechanism checks whether or not the connection is possible or not. If the connection is not possible, then the next best communication protocol is selected. That is, among from the unselected communication protocols, the communication protocol that can expect the excellent performance is selected. In the sextant example, the datagram 409 is selected (step 1501).

If the connection is decided as being possible in step 1502, then the data synchronization mechanism 312 carries out the data synchronization process via the selected communication mechanism (step 1503).

Embodiment 3

The embodiment 3 assumes that an exchanger supplies a function called redirect to the application. The present embodiment endorses an access to the exchanger that does not carry an address specifying means, by using this redirect function and the functions of exchanger. The communication latency is improved from this.

When the access frequencies of the replicated server program, replicated to the host name lexington of FIG. 6, have increased, then the server program is replicated and set to a sw1 which is close to the client machine. The directory service 301 recognizes that the sw1 is in execution status. The client program tries to access to the closest node sw1 based on the information managed by the directory service 301. However, in this example, that sw1 does not have the address of the wireless communication media (i.e., the telephone number for connecting from the wireless mobile terminal). This can be seen in FIG. 6.

Figure 18:
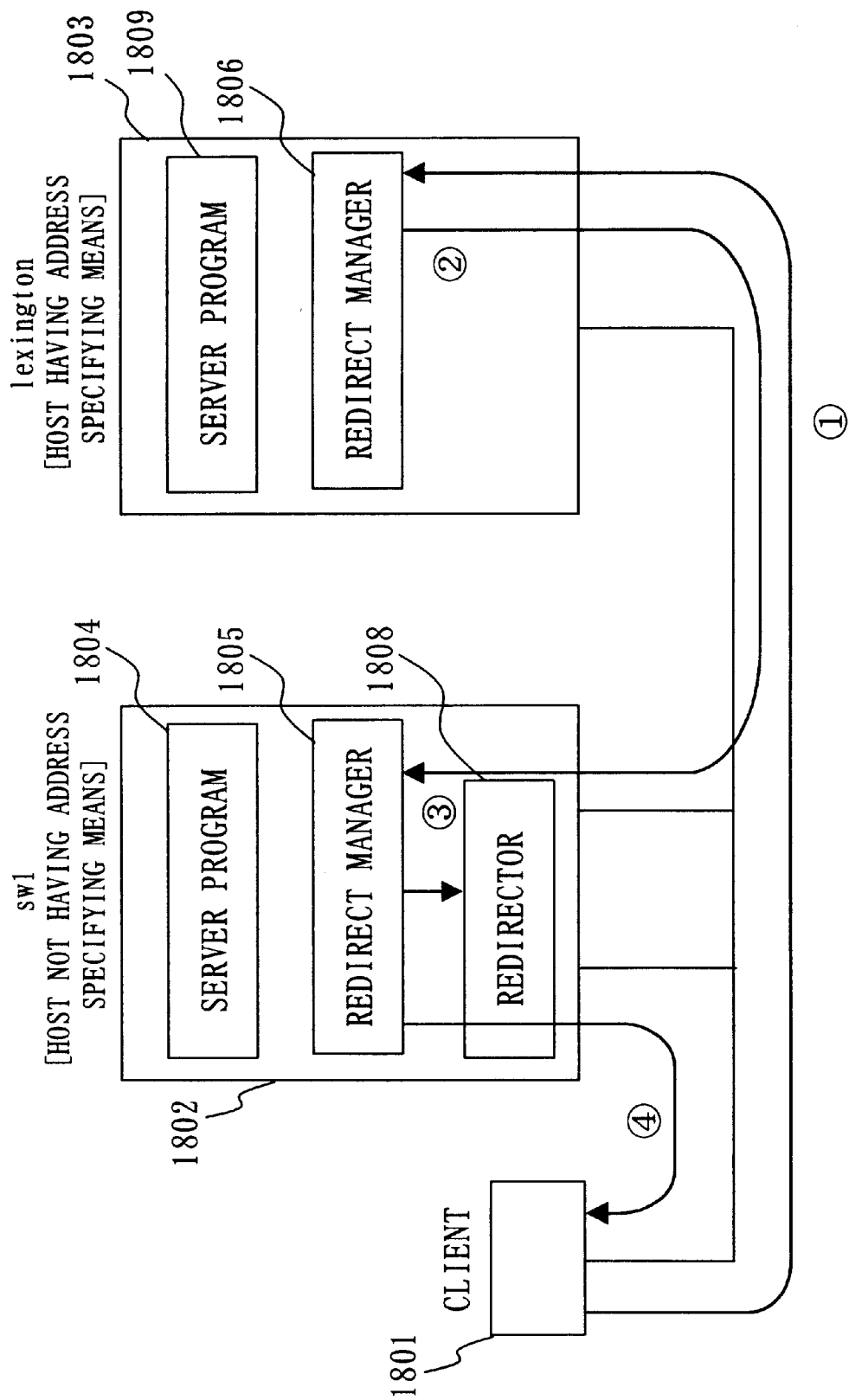
FIG. 18 outlines of the redirect registration.

The drawing of FIG. 18 outlines the redirect registration.

A sw1 1802 is the base station exchanger 107. A client 1801 is the wireless mobile terminal 101. The sw1 1802 is situated on the route for connection from the client 1801 to the lexington 1803. The sw1 1802 has a redirector 1808. The redirector 1808 supplies a switching function for redirecting. The sw1 1802 can receive a PPP message which specifies the telephone number of the connection source and the connection destination by using the function of the redirector. Also, the sw1 1802 can send the PPP message.

A redirect manager is waiting at the server machine which has a possibility of redirecting. Such server machine prepares a port having a number 30000 which is for the redirect manager. In this example, both redirect managers of the lexington 1803 and the sw1 1802 are waiting.

Figure 19:
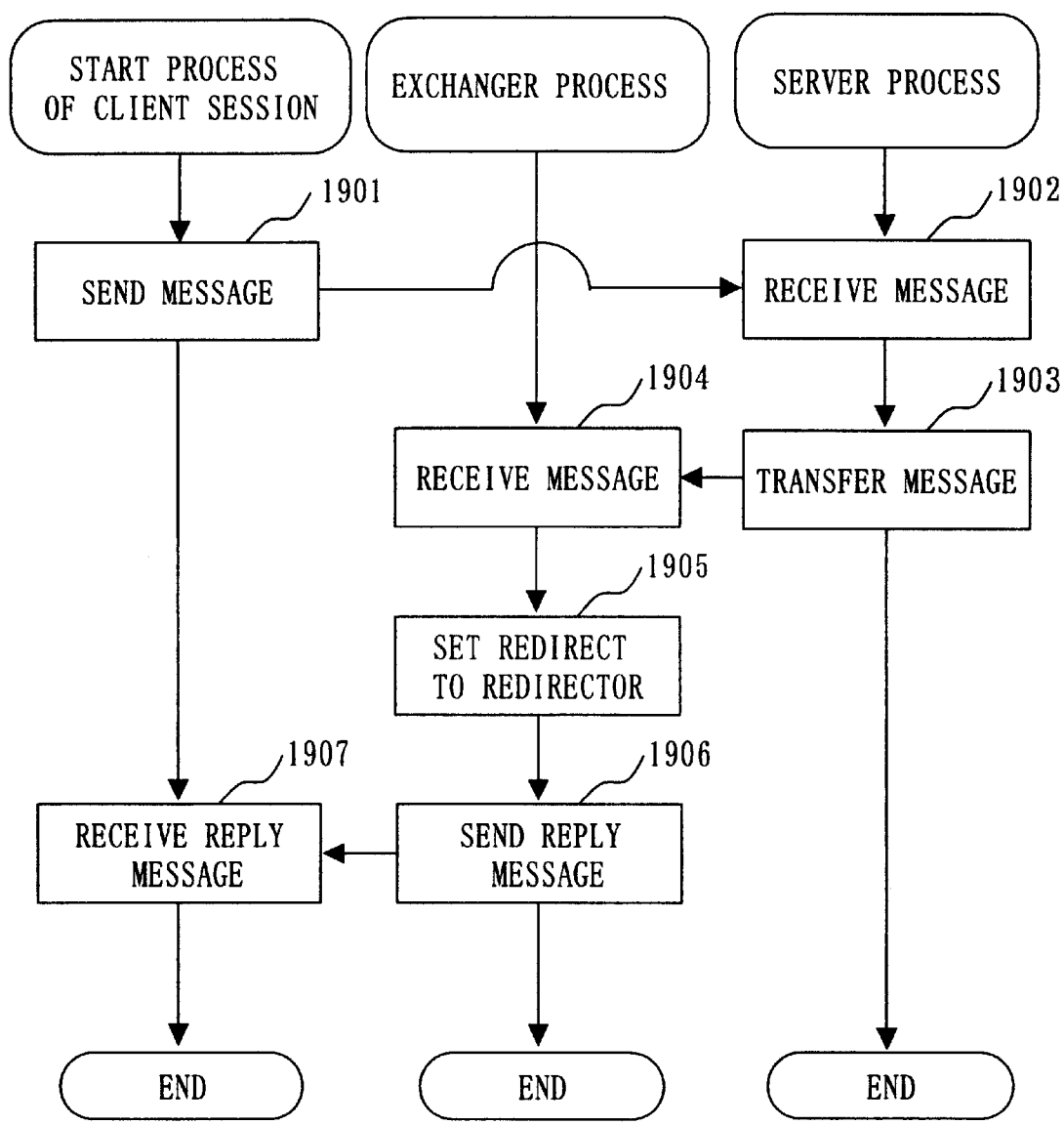
FIG. 19 illustrates a flow of registering redirect.

The drawing of FIG. 19 illustrates the flow of the redirect registration.

Figure 16:
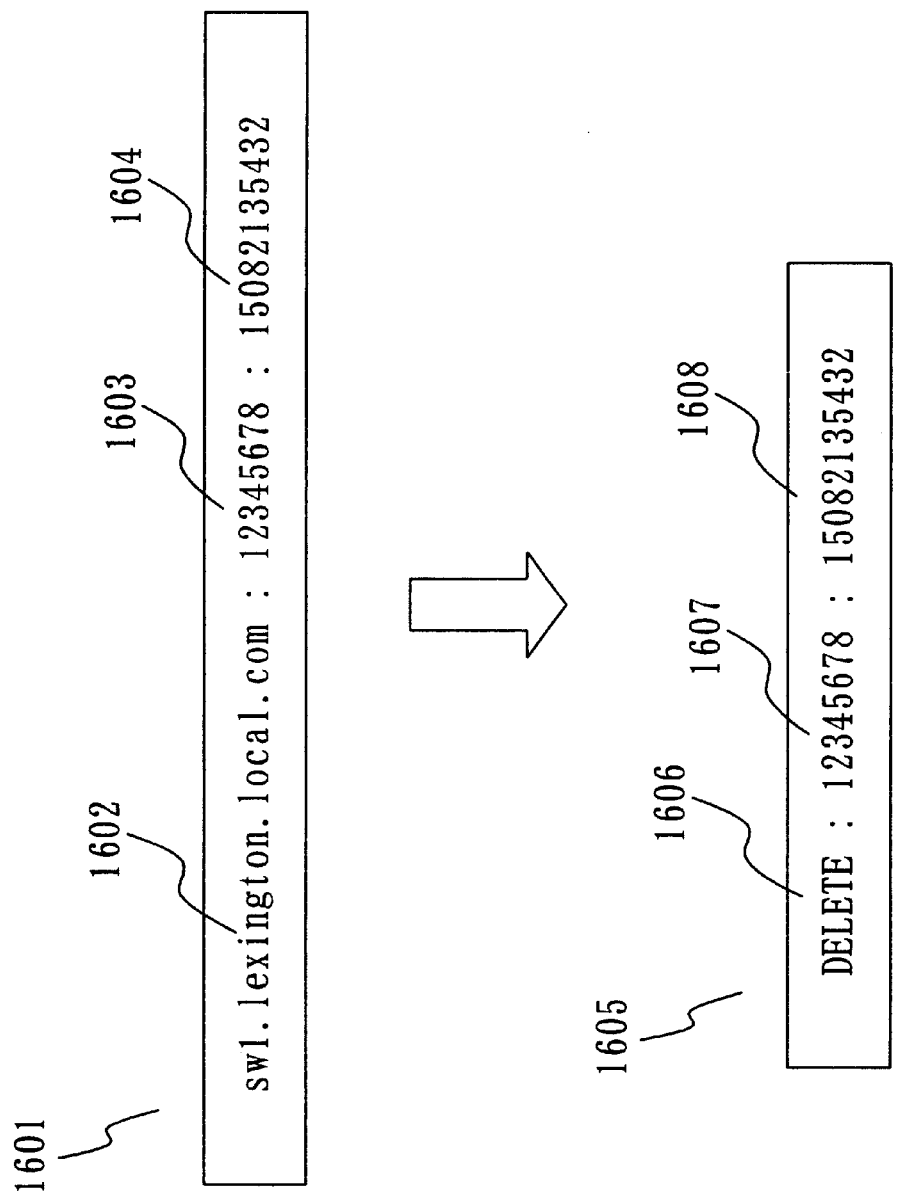
FIG. 16 illustrates an example of the message for sending to the redirect manager.

The client program sends a message to the redirect manager 1806 of the lexington 1803 (step S1901). The lexington 1803 is a server machine which is closest among the server machines attainable. FIG. 16 illustrates the example of the message to be sent to the redirect manager. The reference numeral 1602 is the host name of a server machine specified by using the directory service 301. The reference numerals 1603 and 1604 are the connection source and the connection destination to be redirected by the server machine. In other words, these are the addresses of the client 1801 and the lexington 1803 (in this example, the telephone numbers).

The redirect manager 1806 of the lexington 1803 sends this message to the redirect manager 1805 of the sw1 1802 in step S1903. The redirect manager 1805 of the sw1 1802 receives the message in step S1904, and reads the contents of the message. As a result of this, since the host name is the sw1 itself, the connection source 1603 and the connection destination 1604 are recognized as being subject to the redirect. Then, the redirect manager 1805 of the sw1 1802 registers this information to the redirector 1808 in step S1905. The redirect manager 1805 of the sw1 1802 sends a reply message to the client program in step S1906. In step S1907, the client program receives this reply message. After these steps, the connection from the client 1801 to the lexington 1803 is redirected to the sw1 1802.

The redirector 1808 determines that the specified connection destination coincides with the registered connection destination, and the specified connection source coincides with the registered connection source. Then, the redirector 1808 transfers the found data to the redirect manager 1805. The redirect manager transfers this data to the server program 1804. As such, the client program can connect to the server program 1804 of the sw1 1802 by specifying the lexington 1803 as the connection destination.

Figure 20:
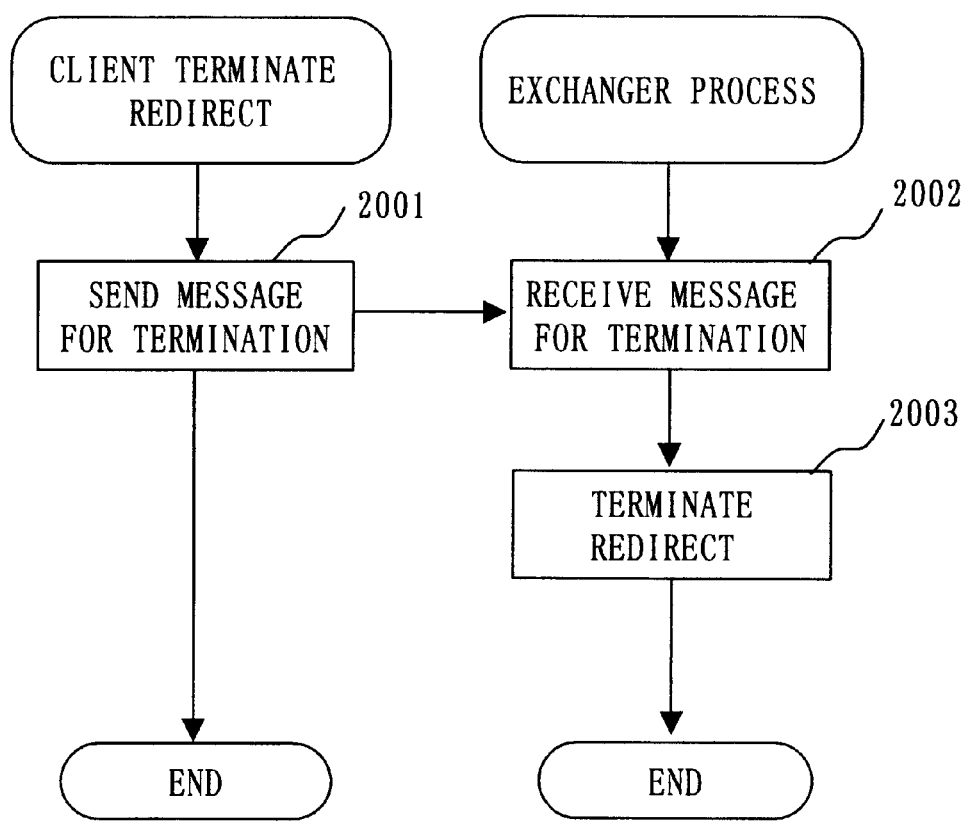
FIG. 20 illustrates a flow of terminating the redirect.

The drawing of FIG. 20 illustrates the flow to terminate the redirect.

The case of terminating the redirect by the client program is described. The client program transfers a message for terminating the redirect to the port having a port number 30000 in step S2001. The reference numeral 1605 of FIG. 16 is an example of the message for terminating the redirect.

This message is redirected and transferred to the redirect manager 1805 of the sw1 1802 in step S2002. The redirect manager 1805 reads the content of the message. The redirect manager 1805 recognizes that the instruction is DELETE, and deletes the redirect registration that coincides with the connection source and connection destination indicated in the reference numerals 1607 and 1608 in step S2003. The redirect is terminated accordingly.

Embodiment 4

The server programs may also be replicated to the wireless terminal. The server program 201 of FIG. 2 is an example of the server program replicated on the server machine which in this case is the wireless terminal. Regardless of the types of the server machine, in this case the wireless terminal, the software of FIG. 3 must be installed.

In the embodiment 4, an example of managing an information that indicates whether or not the replicated server program should depend on the replication source as its attribute information is described. In the case of not depending on the replication source, the replicated server program operates independently.

For example, a replication of the database access 303 is described. The server machine management 305 of the replicated server machine creates an empty container "DBaccessdata". This container is a container to be used by the database access 303. The data synchronization mechanism 312 obtains the replication of the data object via the datagram 409. After the data synchronization is completed, the database access 303 commences execution. The factor of start execution command is the container name "DBaccessdata" and an option "nosync". When the option "nosync" is present, even if the data object is inserted in the container for the purpose of referencing the data, the data synchronization process is not carried out. Accordingly, the data object stored in the container of the other server programs cannot be referred from this server program if after the database access 303 has commenced execution.

This function, for example, can be used in the case of referring to the database within the local loop of the base station controller 106 of FIG. 1. This function is valid when the service moves into some area for referring to the data.

Embodiment 5

The embodiment 5 describes the example of stopping the server program when the execution of a server program need no longer be continued, which is decided based on the usage statistic of the client program. From this, the resource being used by the server program is released.

A service program which has not replicated the service program to the other nodes is recognizing that it is the end terminal of the dependent relationship, except for the case of replication as described in the embodiment 4.

Figure 17:
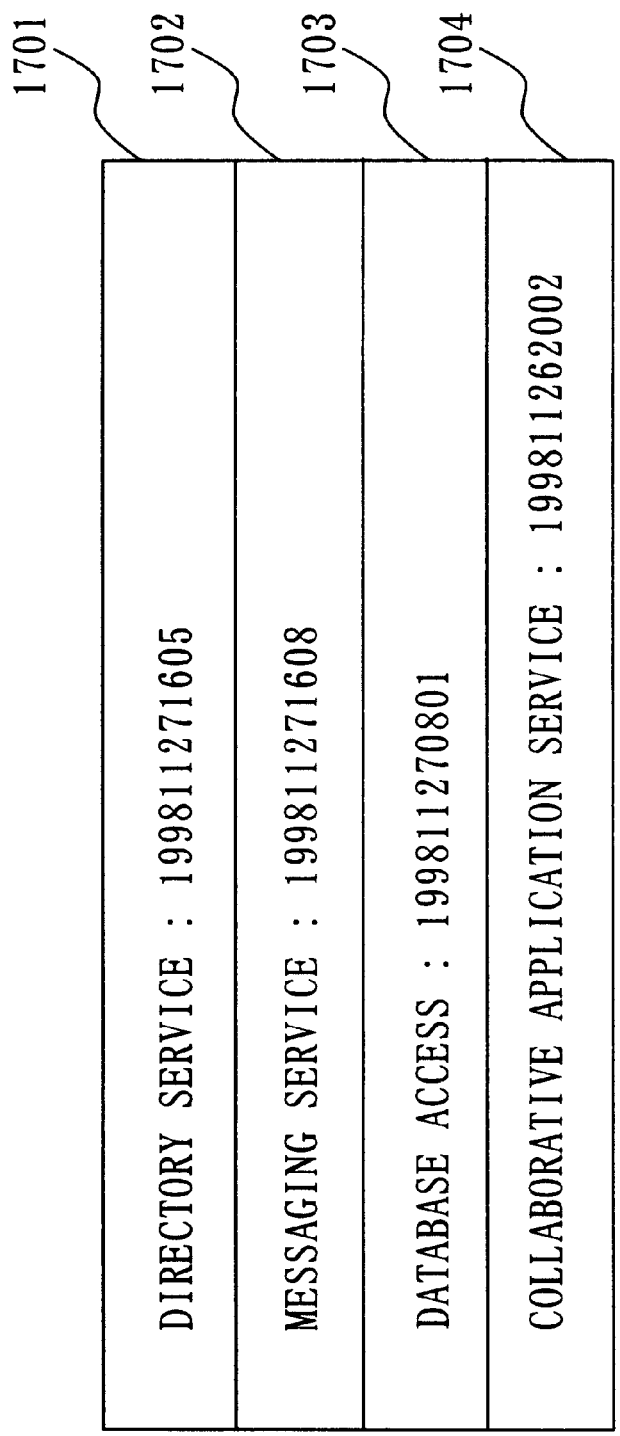

Each server program manages a time of the last access by the user. The drawing of FIG. 17 illustrates a chart which manages the last access time. The server replication management 305 periodically checks this chart. "Periodically" means 3 hours interval, for example. When a difference between the last access times 1701, 1702, 1703, and 1704 and the time checked have exceeded a pre-determined time, then the server replication management 305 decides that the server program execution need no longer be continued. The pre-determined time is 3 hours, for example.

The server replication management 305 instructs an update of the service operation status to the directory service

301. The directory service 301 changes all of the operation statuses of its entries to "no". Then, the server replication management unit 305 waits at a sufficient interval for synchronizing the updated data. After that, all of the server programs are stopped, and further the containers which were being used by each server program are deleted. The server program is deleted accordingly.

Embodiment 6

The embodiment 6 describes the example of selecting the optimal media among from a plurality of communication media prepared at the mobile terminal, by using the datagram message response mechanism.

The communication latency measure message response unit 902 creates a route information. The route information is configured from an entry containing its address. "1" is written in the forward route 1105 and the returning route 1106 of this entry.

The communication latency measure message response unit 902 sends this route information to a node. The server programs are set on this node.

The communication latency measure message response unit 902 which has received the route information immediately returns the route information to the source of transmission as it is.

The communication latency measure message response unit 902 which has received the returned route information measures the time from the transmission to the reception. The response time can be measured this way.

For example, in the case of using a mobile terminal as a client machine for communication to a server machine, a plurality of communication media may be selected. In such cases, the mobile terminal measures the response time of each communication media by using this mechanism. Furthermore, the mobile terminal compares the response times and select the communication media having a good response time.

The present embodiments can shorten the communication route between the client machine and the server machine since the server programs are replicated and set close to the client machine. Due to this, the response times of the server programs improves. Also, as a secondary effect, the communication cost involved can be reduced by shortening the distance required in the communication session from the client machine to the server program. The communication traffic between the server machines is restricted to an amount of communication required in the data synchronization. Accordingly, the communication traffic is reduced in the whole system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication method among at least one server configured to execute a server program, and a client machine configured to execute a client program, comprising:
   measuring a communication characteristic between the client machine and the server machine;
   comparing the measured communication characteristic with a pre-determined communication characteristic threshold;
   selecting a server candidate machine situated closer to the client machine than the server machine, if the measured communication characteristic fails to meet the pre-determined communication characteristic threshold; and
   causing at least a part of the server program to be replicated from the server machine to the selected server candidate machine; thereby creating a replicated server program in the server candidate machine,
   wherein the replicated server program is executed by the server candidate machine.

2. The communication method of claim 1, wherein the server candidate machine functions as the server machine.

3. The communication method of claim 1, further comprising:
   synchronizing at least a part of the replicated server program of the server candidate machine corresponding to a replication destination program, and at least a part of the server program of the server machine corresponding to a replication source program.

4. The communication method of claim 3, wherein the synchronizing step synchronizes automatically.

5. The communication method of claim 1, further comprising:
   performing a data communication between the server machine and the server candidate machine via a communication mechanism suitable for a communication protocol;
   accumulating a-statistical information regarding the data communication;
   judging whether a change of the communication protocol is necessary or not based on the statistical information; and
   choosing a new communication protocol if the judging step judges that the change is necessary, and changing the communication mechanism to a new communication mechanism suitable for the new communication protocol.

6. The communication method of claim 1, wherein the server program includes an interface for each kind of communication media that can be used by the client program; the communication method further comprising:
   waiting for a communication request at the interface by the server program;
   deciding a communication protocol based on the communication request if the server program have received the communication request; and
   setting a data transfer control unit which corresponds to the communication protocol.

7. The communication method of claim 1, wherein the server machine includes a server machine side redirect manager, and the server candidate machine includes a server candidate machine side redirect manager and a redirector; the communication method further comprising:
   transmitting a message from the client machine to the server machine, the transmitted message including an address of the server machine, an address of the client machine, and an address of the server candidate machine;
   receiving the transmitted message at the server machine using the server machine side redirect manager;
   transferring the received message to the server candidate machine based on the address of the server candidate machine included in the message;
   receiving the transferred message at the server candidate machine using the server candidate machine side redirect manager; and registering, at the redirector, the addresses of the server machine and client machine included in the received message the addresses being registered by the server candidate machine side redirect manager.

8. The communication method of claim 1 further comprising:

storing information, which indicates whether or not the server program of the server candidate machine should depend on the server program of the server machine, as an attribute of the server program of the server candidate machine;

wherein the server program of the server candidate machine operates independently if the attribute indicates that the server program of the server candidate machine does not depend on the server program of the server machine.

9. The communication method of claim 1, wherein the server machine is one of a plurality of server machines, and the server candidate machine is one of a plurality of server candidate machine; the communication method further comprising:

storing position information corresponding to the plurality of server machines;

storing position information corresponding to the plurality of server candidate machines;

searching for the server machine from among the plurality of server machines based on proximity to the client machine's location; and searching for the server candidate machine from among the plurality of server candidate machines based on proximity to the client machine's location.

10. The communication method of claim 1, further comprising:

transmitting a datagram message from the client program to the server program;

receiving the datagram message at the server program;

returning the datagram message from the server program to the client program;

receiving, at the client program, the datagram message; and measuring a response time based on a transmission time and a reception time of the datagram message at the client program.

11. The communication method of claim 10, wherein the client machine is capable of using a plurality of communication media, the communication method further comprising:

selecting an optimal communication media by the client program based on the response time.

12. The communication method of claim 1, further comprising:

storing information regarding usage of the server program by the client program;

judging whether continued execution of the server program is necessary or not based on the usage information; and stopping the execution of the server program if the continued execution of the server program is judged to be unnecessary.

13. The communication method of claim 1, the client machine being a wireless terminal, wherein the selecting step selects one of a base station controller and a base station as the server candidate machine.

14. The communication method of claim 1, wherein the selecting step selects, as the server client machine, a machine that is communicatively connected between the client machine and server machine in a communication path serving the client and server machines.

15. The communication method of claim 1, wherein the executing step executes the replicated server program such that the server candidate machine receives and processes data requests from the client machine while the replicated server program is executing.

16. A communication method in a system including a server machine and a client machine operable to communicate with one another using a server program at the server machine, comprising:

replicating, at a server candidate machine, at least a portion of a server program in the server machine thereby creating a replicated server program in the selected server candidate machine; and executing the replicated server program in the selected server candidate machine, wherein at least one of the replicating and executing steps are performed in response to a measured communication characteristic not meeting a predetermined threshold, the measured communication characteristic corresponding to communications between the server machine and the client machine.

17. The method of claim 16, further comprising:

selecting the server candidate machine as a machine closer to the client machine than the server machine.

18. The method of claim 16, wherein the server client machine is communicatively connected between the client machine and the server machine in a communication path servicing communications between the client and server machines, and the method further comprises:

receiving and processing data requests from the client machine at the server candidate machine while the replicated server program is being executed.

* * * * *